United States Patent
Im et al.

(10) Patent No.: US 12,065,773 B2
(45) Date of Patent: Aug. 20, 2024

(54) WASHING MACHINE AND CONTROL METHOD THEREFOR

(71) Applicant: LG Electronics Inc., Seoul (KR)

(72) Inventors: Myunghun Im, Seoul (KR); Hwanjin Jung, Seoul (KR); Sunggyun Kim, Seoul (KR); Jaehyun Kim, Seoul (KR); Kyungchul Woo, Seoul (KR)

(73) Assignee: LG Electronics Inc., Seoul (KR)

( * ) Notice: Subject to any disclaimer, the term of this patent is extended or adjusted under 35 U.S.C. 154(b) by 666 days.

(21) Appl. No.: 17/271,932

(22) PCT Filed: Aug. 30, 2019

(86) PCT No.: PCT/KR2019/011220
§ 371 (c)(1),
(2) Date: Feb. 26, 2021

(87) PCT Pub. No.: WO2020/046076
PCT Pub. Date: Mar. 5, 2020

(65) Prior Publication Data
US 2021/0317604 A1    Oct. 14, 2021

(30) Foreign Application Priority Data

Aug. 30, 2018 (KR) ..................... 10-2018-0103080
Aug. 20, 2019 (KR) ..................... 10-2019-0101924

(51) Int. Cl.
*D06F 23/02* (2006.01)
*D06F 33/34* (2020.01)
(Continued)

(52) U.S. Cl.
CPC ............ *D06F 33/36* (2020.02); *D06F 23/025* (2013.01); *D06F 33/34* (2020.02); *D06F 34/18* (2020.02);
(Continued)

(58) Field of Classification Search
None
See application file for complete search history.

(56) References Cited

U.S. PATENT DOCUMENTS

2004/0158933 A1    8/2004    Seo et al.
2012/0180228 A1    7/2012    Lee et al.
(Continued)

FOREIGN PATENT DOCUMENTS

CN    102471976    5/2012
CN    104093896    10/2014
(Continued)

OTHER PUBLICATIONS

International Search Report in International Appln. No. PCT/KR2019/011220, dated Dec. 30, 2019, 11 pages (with English translation).
(Continued)

*Primary Examiner* — Levon J Shahinian
(74) *Attorney, Agent, or Firm* — Fish & Richardson P.C.

(57) ABSTRACT

A front-loading washing machine and a control method therefor are disclosed. The control method includes: when a sensed amount of laundry in a drum is equal to or less than a preset amount, rubbing step at which the drum is rotated in both directions, wherein the rubbing step comprises: a first rotation step at which the drum is rotated in a first direction by a preset one-direction rotational angle; and a second rotation step at which the drum is rotated by the one-direction rotational angle in a second direction opposite to the first direction, and wherein the first rotation step and the second rotation step are performed alternately and repeatedly. Accordingly, it is possible to perform a washing motion which improves washing performance and reduces wear and tear of the laundry.

20 Claims, 18 Drawing Sheets

(51) Int. Cl.
    *D06F 33/36*     (2020.01)
    *D06F 34/18*     (2020.01)
    *D06F 35/00*     (2006.01)
    *D06F 37/06*     (2006.01)
    *D06F 37/30*     (2020.01)
    *D06F 39/08*     (2006.01)
    *D06F 103/04*    (2020.01)
    *D06F 103/18*    (2020.01)
    *D06F 105/02*    (2020.01)
    *D06F 105/48*    (2020.01)

(52) U.S. Cl.
    CPC ............ *D06F 35/006* (2013.01); *D06F 37/06* (2013.01); *D06F 37/304* (2013.01); *D06F 39/087* (2013.01); *D06F 39/088* (2013.01); D06F 2103/04 (2020.02); D06F 2103/18 (2020.02); D06F 2105/02 (2020.02); D06F 2105/48 (2020.02); Y02B 40/00 (2013.01)

(56)              References Cited

U.S. PATENT DOCUMENTS

| 2012/0210518 | A1 | 8/2012  | Bae et al.        |
| 2013/0291313 | A1 | 11/2013 | Seo et al.        |
| 2016/0160432 | A1 | 6/2016  | Ashrafzadeh et al.|
| 2017/0073877 | A1 | 3/2017  | Hettinger et al.  |

FOREIGN PATENT DOCUMENTS

| DE | 2915092     | 10/1979 |
| JP | H05130760   | 5/1993  |
| JP | H0819684    | 1/1996  |
| JP | H09-182887  | 7/1997  |
| JP | H11-244569  | 9/1999  |
| JP | 2005-124764 | 5/2005  |
| JP | 2006288706  | 10/2006 |
| JP | 2009-189677 | 8/2009  |
| JP | 2011-041740 | 3/2011  |
| JP | 2012-055349 | 3/2012  |
| JP | 2014-079490 | 5/2014  |
| KR | 20050115342 | 12/2005 |
| KR | 20100053946 | 5/2010  |
| KR | 20160032474 | 3/2016  |
| KR | 20170111261 | 10/2017 |
| KR | 20180015867 | 2/2018  |
| KR | 20180076561 | 7/2018  |

OTHER PUBLICATIONS

Office Action in Japanese Appln. No. 2021-510834, dated May 17, 2022, 11 pages (with English translation).
Office Action in Chinese Appln. No. 201980056993.5, dated Jul. 27, 2022, 14 pages (with English translation).
Japanese Office Action in Japanese Appln. No. 2021-510834, mailed on Mar. 28, 2023, 10 pages (with English translation).
Australian Office Action in Australian Appln. No. 2019327288, dated Apr. 8, 2022, 6 pages.
Extended European Search Report in European Appln. No. 19854040.3, dated May 2, 2022, 8 pages.

(b)

(a)

70c  61  62  63

(a)

(b)

(c)

WASHING MACHINE AND CONTROL METHOD THEREFOR

CROSS-REFERENCE TO RELATED APPLICATIONS

This application is a National Stage application under 35 U.S.C. § 371 of International Application No. PCT/KR2019/011220, filed on Aug. 30, 2019, which claims the benefit of Korean Patent Application No. 10-2018-0103080, filed on Aug. 30, 2018 and Korean Patent Application No. 10-2019-0101924, filed on Aug. 20, 2019. The disclosures of the prior applications are incorporated by reference in their entirety.

BACKGROUND OF THE INVENTION

Field of the Invention

The present disclosure relates to a washing machine and a control method therefor, and more particularly to a washing machine capable of implementing a new motion and a control method therefor.

Related Art

A washing machine is a general term indicating a device for removing a contaminant stuck to clothes, bedding, etc. (hereinafter, referred to as 'the laundry') using a chemical disintegration of water and a detergent and a physical operation such as a friction between water and the laundry.

Washing machines may be classified largely into a top-loading washing machine and a front-loading washing machine.

In the top-loading washing machine, a laundry loading hole is located at the top and a washing tub and a pulsator are rotated on a vertical rotational center. The top-loading washing machine performs a washing operation as a water flow is formed by the rotation of the washing tub and/or the pulsator.

In the front-loading washing machine, a laundry-loading hole is located at the front and a washing tub is rotated on an approximately horizontal rotation center. A lifter is provided in an inner circumferential surface of the washing tub, and a washing operation is performed as laundry flows by the lifter in accordance with rotation of the washing tub.

A recently developed front-loading washing machine implements various motions by combining a direction of rotation of a washing tub and a rotational speed of the washing tub.

Korean Patent Application Publication No. 10-2011-0022359 discloses a rolling motion, a tumbling motion, a step motion, a swing motion, a scrub motion, a filtration motion, and squeeze motion by combining a direction of rotation of a drum and a rotational speed of the drum.

Although the recently developed front-loading washing machine is capable of implementing various motions, a motion with enhanced washing power may cause damage to laundry and a motion causing less damage to the laundry provides insufficient washing power.

RELATED ART DOCUMENT

Patent Document

Korean Patent Application Publication No. 10-2011-0022359

SUMMARY OF THE INVENTION

An object of the present disclosure is to provide a washing machine and a control method therefor, the washing machine which implements a new motion different from a conventional motion applied to a front-loading washing machine.

Another object of the present disclosure is to provide a washing machine and a control method therefor, the washing machine which implements a new motion that provides excellent washing power compared with a conventional motion applied to a front-loading washing machine.

Yet another object of the present disclosure is to provide a washing machine and a control method therefor, the washing machine which provides excellent washing power and causes less damage to laundry compared with a conventional motion.

Yet another object of the present disclosure is to provide a washing machine and a control method therefor, the washing machine which provides excellent washing power compared with a conventional motion even though the conventional motion and a flow of laundry implement an identical or similar motion.

Other objects of the present disclosure not mentioned herein will be clearly understood from the following description by those skilled in the art to which the inventive concept pertains.

In order to achieve the above-described objects, a control method for a washing machine according to an embodiment of the present disclosure includes performing washing by rotating a drum.

The control method further includes sensing an amount of laundry inside a drum.

The control method may include, when the sensed amount of the laundry is equal to or less than a preset amount, a rubbing step at which the drum is rotated in both directions to perform washing.

The control method may further include, when the sensed amount of laundry is greater than the preset amount, performing washing by rotating the drum in one direction.

The rubbing step includes: a first rotation step of rotating the drum in a first direction, and a second rotation step of rotating the drum in a second direction opposite to the second direction.

The first rotation step and the second rotation step are performed alternately and repeatedly.

In the first rotation step, the drum may be rotated at acceleration until reaching a preset target rotational speed, and rotated the target rotational speed after the accelerating rotation. The first rotation step may include a constant-acceleration rotation step of rotating the drum until reaching the target rotational speed, and a constant-speed rotation step of rotating the drum at the target rotational speed after the constant-acceleration rotation step.

I the second rotation step, the drum may be rotated at acceleration until reaching the target rotational speed, and then rotated at the target rotational speed after the accelerating rotation. The second rotation step may include a constant-acceleration rotation step of rotating the drum at constant acceleration until reaching the target rotational speed, and a constant-speed rotation step of rotating the drum at the target rotational speed after the constant-acceleration rotation step.

The target rotational speed may be set in a range between 56 rpm and 94 rpm. The target rotational speed may be set in a range between 56 rpm and 64 rpm.

An acceleration gradient in a section of rotating the drum at acceleration in the first rotation step and the second rotation step may be equal to or greater than 30 rpm/s. An acceleration gradient in a section of rotating the drum at acceleration in the first rotation step and the second rotation step may be set to a maximum value that can be output from a wash motor which rotates the drum.

In the first rotation step, the drum may be rotated one time or more. In the second rotation step, the drum may be rotated one time or more.

The first rotation step may include a step at which, the drum is rotated one time or more in the first direction so that the rotation position of the drum after the drum is rotated in the first direction is reversed compared to before the drum is rotated in the first direction. The second rotation step may include a step at which the drum is rotated on time or more in the second direction so that the rotation position of the drum after the drum is rotated in the second direction is reversed compared to before the drum is rotated in the second direction.

A rotation position of the drum in an initial stage of the first rotation step and a rotation position of the drum in an initial stage of the second rotation step may be reversed. A rotation position of the drum before rotation of the drum in a first direction and a rotation position of the drum before rotation of the drum in a second direction may be are reversed.

The washing machine may include a plurality of lifters provided on an inner circumferential surface of the drum. The plurality of lifters may be spaced apart from each other at an equal interval.

The drum may be rotated one and a half times in each of the first rotation step and the second rotation step, and a difference between a rotation position of the drum in an initial stage of the first rotation step and a rotation position of the drum in an initial stage of the second rotation step may be equal to or less than a half of a distance by which two adjacent lifters in the plurality of lifters are spaced apart from each other.

The one-direction rotational angle may be in a range between 360° and 720°.

The rubbing step may include a step at which the first rotation step and the second rotation step are performed alternately and repeatedly for a preset first time period and then a wash motor for rotating the drum stops from operating for a second time period.

a net acting ratio of the first time period to a sum of the first time period and the second time period is in a range between 86% and 98%.

The washing machine may include a lifter provided on an inner circumferential surface of the drum to protrude toward a rotation center of the drum. A height of the lifter may be equal to or higher than 10 mm and equal to lower than 20 mm.

The control method may further include, after the sensing of the amount of the laundry and before the rubbing step, supplying water to a tub that houses the drum.

A level of the water supplied to the tub may be higher than a drum lower portion that is positioned vertically below the rotation center of the drum.

An amount of the water supplied to the tub may be eight to twelve times an amount of the laundry in the drum.

The washing machine may include a nozzle configured to spray water discharged from the tub into the drum. The rubbing step may further include, while the first rotation step and the second rotation step are performed, spraying the water discharged from the tub into the drum through the nozzle.

A washing machine according to an embodiment of the present disclosure may implement the above-described control method.

The washing machine according to the present disclosure is a front-loading washing machine having a laundry loading hole formed at a front and having a rotation center of a drum, which is horizontal or inclined horizontally more than vertically.

The washing machine comprises a casing formed at a front and having a laundry loading hole formed therein, a tub provided in the casing and containing water, a drum rotatably provided in the tub and housing laundry, a plurality of lifters provided on an inner circumferential surface of the drum, a wash motor for rotating the drum, and a controller configured to control a rotation direction, a rotational speed, and a rotational angle of the drum, through the wash motor.

The controller may rotate the drum by a preset one-direction rotational angle in a first direction, and rotate the drum by the one-direction rotational angle in a second direction opposite to the first direction.

In a section of rotating the drum in the first direction, the controller may rotate the drum at acceleration before reaching a preset target rotation speed and then rotate the drum at the target rotational speed. In a section of rotating the drum in the second direction, the controller may rotate the drum at acceleration until reaching the preset target rotational speed, and rotate the drum at the target rotational speed.

The controller may repeatedly and alternately perform rotation of the drum in the first direction and rotation of the drum in the second direction.

Other details of embodiments are included in the following detailed description and accompanying drawings.

A control method for a washing machine according to the present disclosure has one or more effects, as below.

First, the drum is rotated in one direction by a preset rotation angle and then rotated in the opposite direction by the rotation angle, and thereby, a flow of laundry in the drum may realize a new motion that is different from a conventional motion.

Second, as a lifter having a height lower than that of a conventional lifter is provided, laundry is able to flow inside the drum at a speed at which the laundry can be rotated integrally with the drum in a conventional washing machine. Therefore, a washing cycle may be performed by rotating the drum at a speed faster than in a conventional washing cycle, and, even though not just the new motion, but also the conventional motion and a flow of laundry realize an identical motion or similar motions, washing power may improve.

Third, as the drum is rotated at a speed faster than in a conventional washing cycle, washing machine may improve, and, as rotation of the drum by a preset rotation angle in one direction and the other direction is performed alternately and repeatedly, laundry may be less damaged Effects of the present disclosure are not limited to the aforementioned effects, and other effects of the present disclosure which are not mentioned above will become apparent to those having ordinary skill in the art from the claims.

DESCRIPTION OF EXEMPLARY EMBODIMENTS

Figure 1:
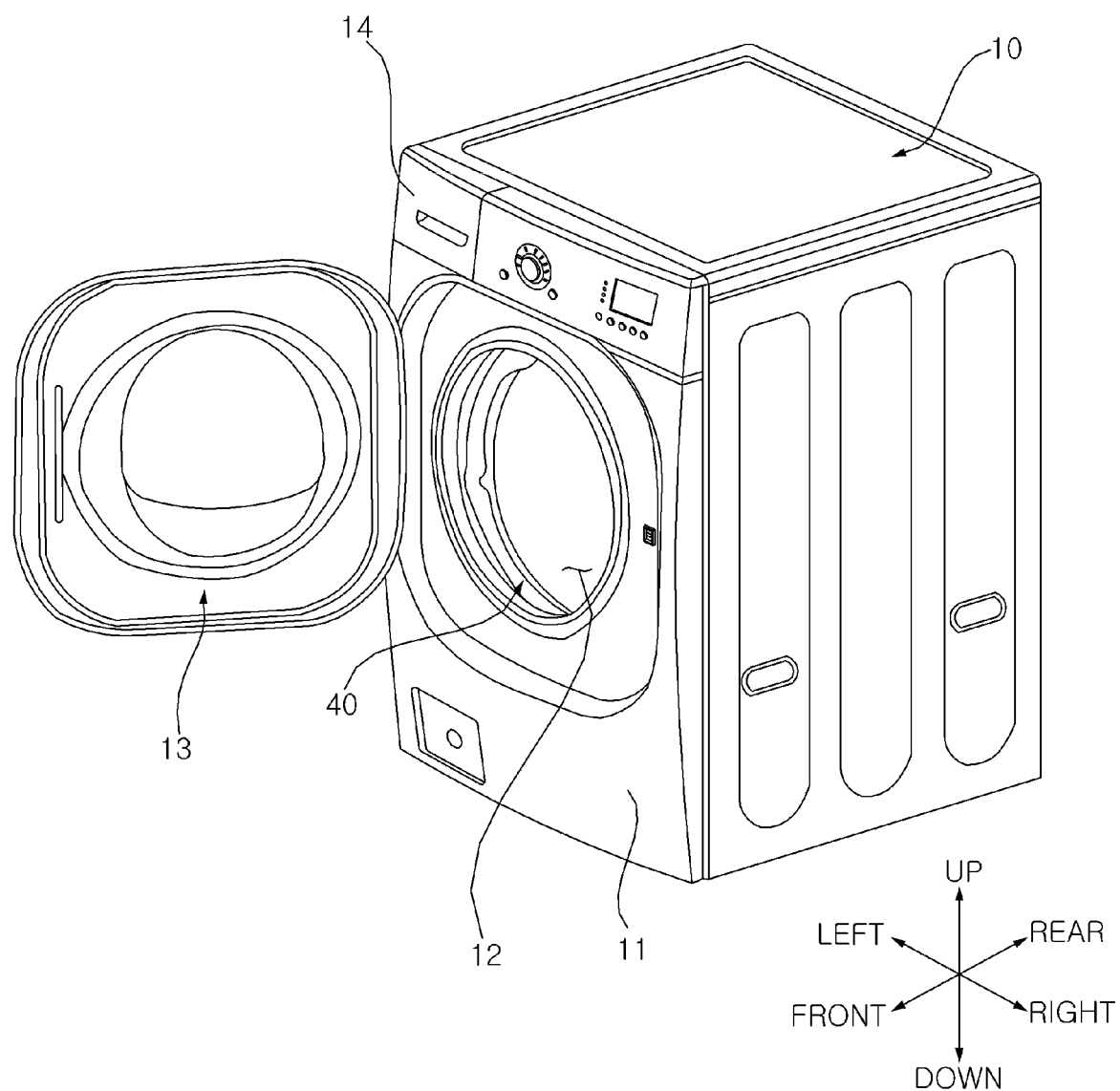
FIG. 1 is a perspective view of a washing machine according to an embodiment of the present disclosure.

Advantages and features of the present disclosure and a method of achieving the same will be clearly understood from embodiments described below in detail with reference to the accompanying drawings. However, the present disclosure is not limited to the following embodiments and may be implemented in various different forms. The embodiments are provided merely for complete disclosure of the present disclosure and to fully convey the scope of the disclosure to those of ordinary skill in the art to which the present disclosure pertains. The present disclosure is defined only by the scope of the claims. In the drawings, the thickness of layers and regions may be exaggerated for clarity. Throughout the drawings, like numbers refer to like elements.

Figure 2:
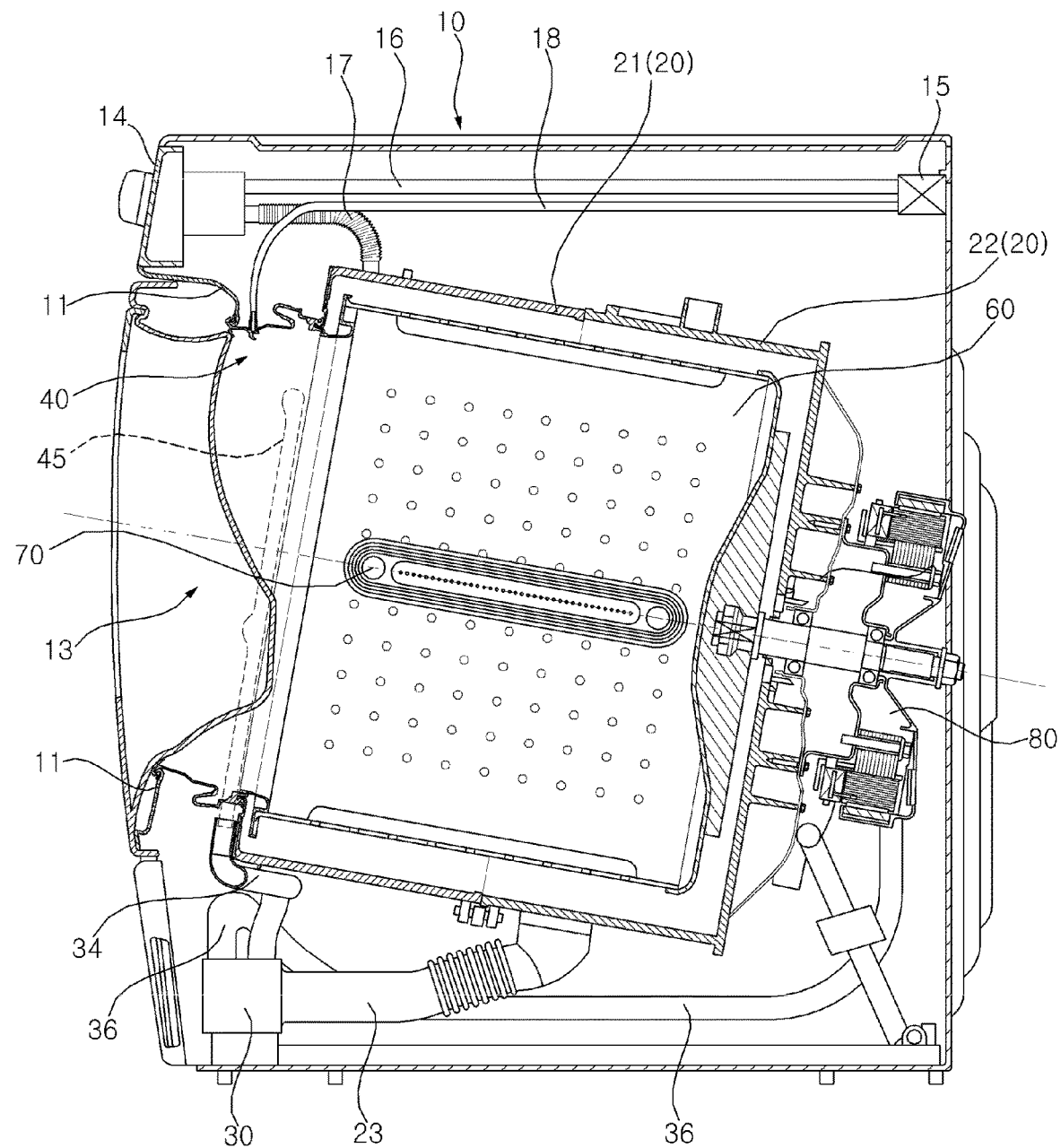
FIG. 2 is a cross-sectional view of the washing machine shown in FIG. 1.
Figure 21:
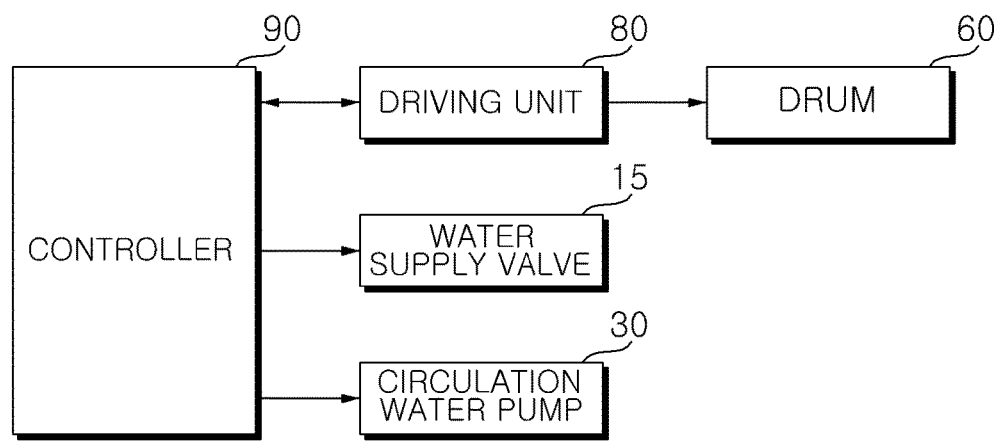
FIG. 21 is a block diagram showing a control relationship between elements of washing machine according to an embodiment of the present disclosure.

Referring to FIGS. 1, 2, and 21, a washing machine according to an embodiment of the present disclosure includes a casing 10 forming an outer appearance of the washing machine, a tub 20 for storing wash water, a drum 60 rotatably installed inside the tub 20 to introduce laundry, and a motor 80 for rotating the drum 60.

A front panel 11 having a laundry loading hole 12 formed therein may be disposed at a front of the casing 10, a door 13 for opening and closing the laundry loading hole 12 may be disposed at the front panel 11, and a dispenser 14 for introducing detergent may be installed at the front panel 11.

In addition, a water supply valve 15, a water supply pipe 16, and a water supply hose 17 may be installed inside the casing 10 so that wash water supplied after passing through the water supply valve 15 and the water supply pipe 16 is mixed with detergent in the dispenser 14 and is then supplied to the tub 20 through the water supply hose 17.

In addition, a pump 30 and a circulating water supply pipe 45 may be installed, the pump 30 and the tub 20 may be connected via a discharge hose 23, and the circulating water supply pipe 45 and the pump 30 may be connected directly to each other or may be connected to each other via a connection pipe 34. Thus, when the pump 30 operates, wash water stored in the tub 20 may be sprayed into the drum 60 through the circulating water supply pipe 45 and then circulated. The pump 30 may be connected to a drain pipe 36 and thus discharge wash water to an outside through the drain pipe 36.

As such, the pump 30 according to an embodiment of the present disclosure functions as both a discharge pump for discharging wash water to the outside and a circulation pump for circulating wash water. On the contrary, a discharge pump and a circulation pump may be installed separately, and, in a case where the discharge pump and the circulation pump are installed separately, it is the discharge pump may be connected to the drain pipe 36 and the circulation pump may be connected to the connection pipe 34.

Meanwhile, the tub 20 may be formed as a single tub body or may be formed as a combination of a first tub body 21 and a second tub body 22 coupled thereto.

An a front of the tub 20, an opening is formed to correspond to the laundry loading hole 12 formed in the front panel 11.

The gasket 40 may be disposed between a loading hole boundary of the front panel 11, which defines the laundry loading hole 12, and a boundary of the tub 20, which defines the opening, so that wash water stored in the tub 20 is prevented from leaking from the tub 20.

The drum 40 for accommodating laundry may be rotatably provided in the tub 20. The drum 60 receives laundry, and is disposed such that an entrance hole through which laundry is loaded is disposed at a front surface. The drum 60 is rotated about an approximately horizontal rotation center line. In this case, "horizontal" does not refer to the mathematical definition thereof. That is, even in the case where the rotation center line is inclined at a predetermined angle relative to a horizontal state, the axis is more like in the horizontal state than in a vertical state, and thus, it is considered that the rotation center line is substantially horizontal. A plurality of through holes 60h may be formed in the drum 60 so as to introduce water contained in the tub 20 into the drum 60.

A lifter 70 provided on the inner circumferential surface of the drum 60 and protruding toward the inside of the drum 60 may be included. A lifter 70b may be manufactured separately from the drum 60 and coupled to the inner circumferential surface of the drum 60 (see FIG. 4). Alternatively, a lifter 70c may be formed integrally with the drum 60 (see FIG. 6). When the drum 60 is rotated, an operation of lifting laundry by the lifter 70 and dropping the laundry may be performed repeatedly.

A driving unit for rotating the drum 40 may be further provided. A driving shaft to be rotated by the driving unit may penetrate the rear of the tub 20 to be coupled to the drum 60.

The driving unit may include a wash motor 80 of which a speed is controllable. The wash motor 80 may be an inverter direct drive motor. The controller 90 may include a Proportional-Integral (PI) controller, a Proportional-Integral-Derivative (PID) controller), and the like. The controller 90 may receive an output value (e.g., an output current) of a pump motor, and control an output value of the driver based on the received output value of the pump motor so that the number of times of rotation of the pump motor follows a preset target number of times of rotation (or a target rotational speed). The controller 90 may control driving of the wash motor 80 in accordance with a driving pattern.

The wash motor 80 may include a stator fixed to a rear side of the tub 20, and a rotor rotating by a magnetic force acting in relation with the stator. The driving shaft may rotate integrally with the rotor.

The controller 90 may not just control the wash motor 80 but also control overall operations of the washing machine. Constituent elements mentioned hereinafter may be controlled by the controller 90.

Figure 3:
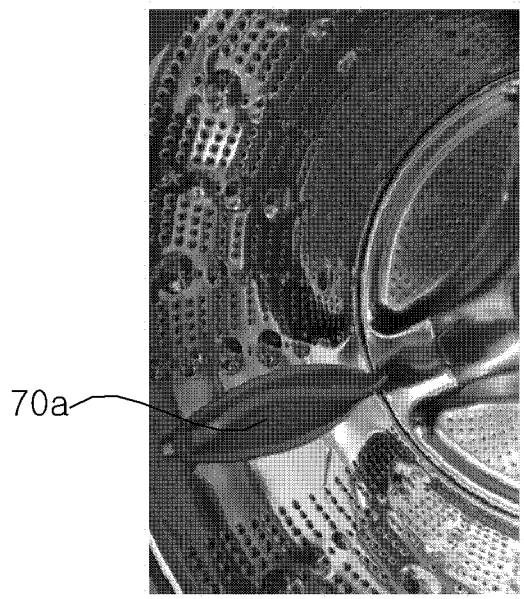
FIG. 3 is a perspective view of a lifter provided inside a drum of a conventional washing machine.

Referring to FIG. 3, a conventional washing machine includes a lifter 70a having a height equal to or higher than 40 mm on an inner circumferential surface of a drum. Such a lifter 70a may restrict flow of laundry, and accordingly, when a rotational speed of the drum is about 40 rpm, the lifter 70a may implement a rolling motion, when a rotational speed of the drum is about 46 rpm, the lifter 70a may implement a tumbling motion, and, when a rotational speed of the drum is about 60 rpm, the lifter 70a may implement a filtration motion. When a rotational speed of the drum is about 60 rpm in the conventional washing machine having the lifter 70a of about 40 mm in height, laundry may be attached to the inner circumferential surface of the drum, it is not possible to implement any other motion at a higher rotational speed, except for braking the drum from rotating.

Figure 4:
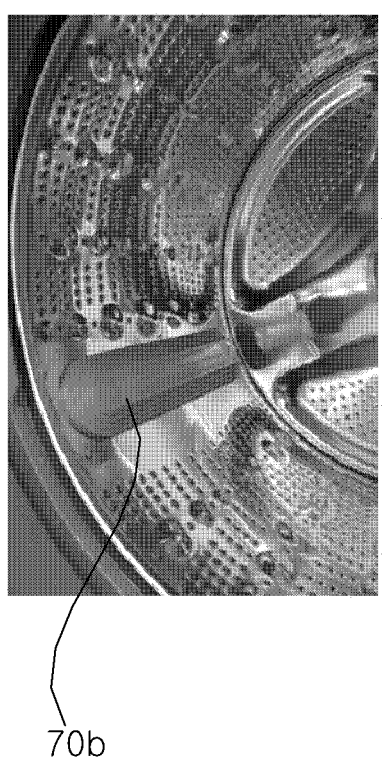
FIG. 4 is a perspective view of a lifter provided inside a drum of a washing machine according to an embodiment of the present disclosure.

FIG. 4 is a perspective view showing a part of an inner circumferential surface of a drum of a washing machine according to a first embodiment of the present disclosure, the washing machine which has a lifter of a height lower than that of a conventional washing machine. FIG. 5(a) is a plan view of a lifter shown in FIG. 4, and FIG. 5(b) is a cross-sectional view of FIG. 5(a) taken away along line I-I'.

Figure 5:
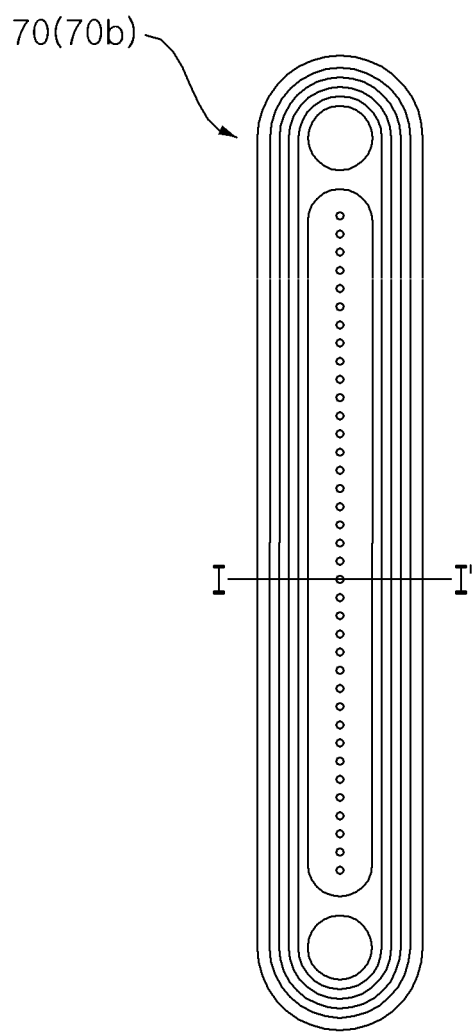
FIG. 5 is a plan view and a cross-sectional view of the lifter shown in FIG. 4.
Figure 5:

Referring to FIGS. 4 and 5, a lifter 70b made separately from the drum 60 and disposed on the inner circumferential surface of a drum 60 has a height equal to higher than 10 mm and equal to lower than 20 mm. The washing machine according to the first embodiment of the present disclosure includes the lifter 70b of a height lower than that of the conventional lifter 70a in order to implement various motions. The height of the lifter 70b may be between 10 mm and 20 mm. The term "between" refers to a value within a range equal to or higher than a lower limit value and equal to or lower than an upper limit value, and this term will be hereinafter used with the same meaning.

In a case where the height of the lifter 70a is 40 mm, if a rotational speed of the drum 60 is gradually increased, laundry may be attached to the drum 60 at a rotational speed of 56 rpm and then start being rotated integrally with the drum 60 (see 15a1 in FIGS. 15(a) and 16a1 in FIG. 16(a)), and this motion is referred to as a filtration motion. That is, in the case where the height of the lifter 70a is 40 mm, a rotational speed of the drum at which the filtration motion stats is 56 rpm.

In a case where the height of the lifter 70b is 20 mm and there is a very small quantity of laundry contained in the drum (when the amount of laundry is less than 1 kg), the laundry is attached to the inner circumferential surface of the drum 60 at a rotational speed of 71 rpm and then starts being rotated integrally with the drum 60. In the case where the height of the lifter 70b is 20 mm and there is a small quantity of laundry contained in the drum 60 (for example, when the amount of laundry is between 1 kg and 2 kg), the laundry is attached to the inner circumferential surface of the drum 60 at a rotational speed of 56 rpm and then starts being rotated integrated with the drum 60.

Therefore, in a case where the height of the lifter 70b is equal to or lower than 20 mm, when a user washes a small amount of laundry, the washing machine according to the first embodiment of the present disclosure is able to implement a new motion that cannot be implemented by the conventional washing machine. In a case where the height of the lifter 70b is higher than 20 mm, the washing machine according to the first embodiment of the present disclosure may restrict a flow of laundry and thus cannot implement a new motion, in the same way as it does when the conventional lifter of 40 mm is given.

However, in a case where the height of the lifter 70b is equal to or lower than 50 mm, sufficient friction does not occur between the inner circumferential surface of the drum 60 and the laundry and thus various motions of the laundry are not made. That is, even though the drum 60 is rotated at a speed faster than 56 rpm, the laundry slips at a certain height between the highest point and the lowest point and then flows while shaking upward and downward. In this case, if the rotational speed of the drum 60 is increased even faster, the laundry may be instantly attached to the inner circumferential surface of the drum at about 96 rpm and thus rotated integrated with the drum 60. Since such a flow may significantly degrade washing performance, the height of the lifter 70b should be higher than 5 mm.

A side rake angle of the lifter 70b as well as a height of the lifter 70b influence in causing a flow of the laundry. If the inclination angle is small, this leads to a situation as the same as when the height of the lifter 70b is equal to or lower than 5 mm.

Thus, every lift 70b disposed in the inner circumferential surface of the drum 60 may be formed in a height between 10 mm and 20 mm. A more detailed description will be provided with reference to FIGS. 15 and 16.

A different amount of laundry may be allowed in the washing machine according to a diameter of the drum 60. The greater amount of laundry, the less portion of laundry directly influenced by the lifter 70. Therefore, in order to implement a rubbing motion according to an inner diameter of the drum 60, the height of the lifter 70b can be changed, and the height of the lifter 70b may be set differently according to the inner diameter of the drum 60. That is, the lifter 70 may have a height which is at a predetermined ratio to the inner diameter of the drum 60.

The height of the lifter 70b may be equal to or higher than 2% and equal to or lower than 4.2% of the inner diameter of the drum 60. In a case where the inner diameter of the drum 60 is between 480 mm and 520 mm, the height of the lifter may be about between 10 mm and 22 mm. In addition, in a case where the inner diameter of the drum 60 is between 570 mm and 600 mm, the height of the lifter 70b may be equal to or higher than 11 mm and equal to or lower than 25 mm.

Meanwhile, although the inner diameter of the drum 60 is increased, the amount of the laundry may be maintained at a constant level, and in this case, the height of the lifter 70b may be between 10 mm and 20 mm, irrespective of the inner diameter of the drum 60.

The lifter 70b shown in FIGS. 4 and 5 is illustrated as a linear shape in a forward-backward direction of FIG. 1 (hereinafter, referred to as a "depth direction of the drum", but aspects of the present disclosure are not limited thereto. Instead, the lifter 70b may be formed in a non-linear shape in which one end and the other end of one side of the lifter 70b are twisted by a predetermined angle relative to a predetermined central axis, and a height of the lifter 70b may be increased within a range between 10 mm and 20 mm front a front surface toward a rear surface of the drum 60.

Lifters 70b provided in the inner circumferential surface of the drum 60 may be spaced apart from each other at a predetermined interval along a circumferential surface of the drum. That is, in a case where three lifters 70b are formed in the inner circumferential surface of the drum 60, the lifters 70b may be disposed to form an angle of 120° relative to each other. Although FIG. 5 shows a part of the drum having three lifters 70b formed therein, three or more lifters 70b may be disposed and, even in this case, the lifters 70b may be disposed to form a predetermined angle relative to each other.

Figure 6:
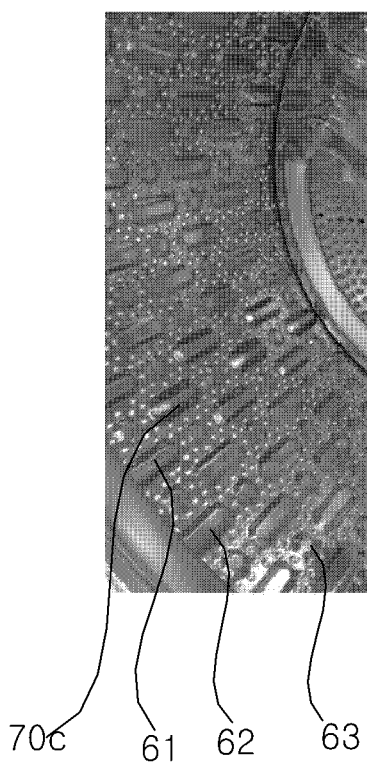
FIG. 6 is a perspective view of a lifter integrally formed with a drum of a washing machine according to another embodiment of the present disclosure.
Figure 7:
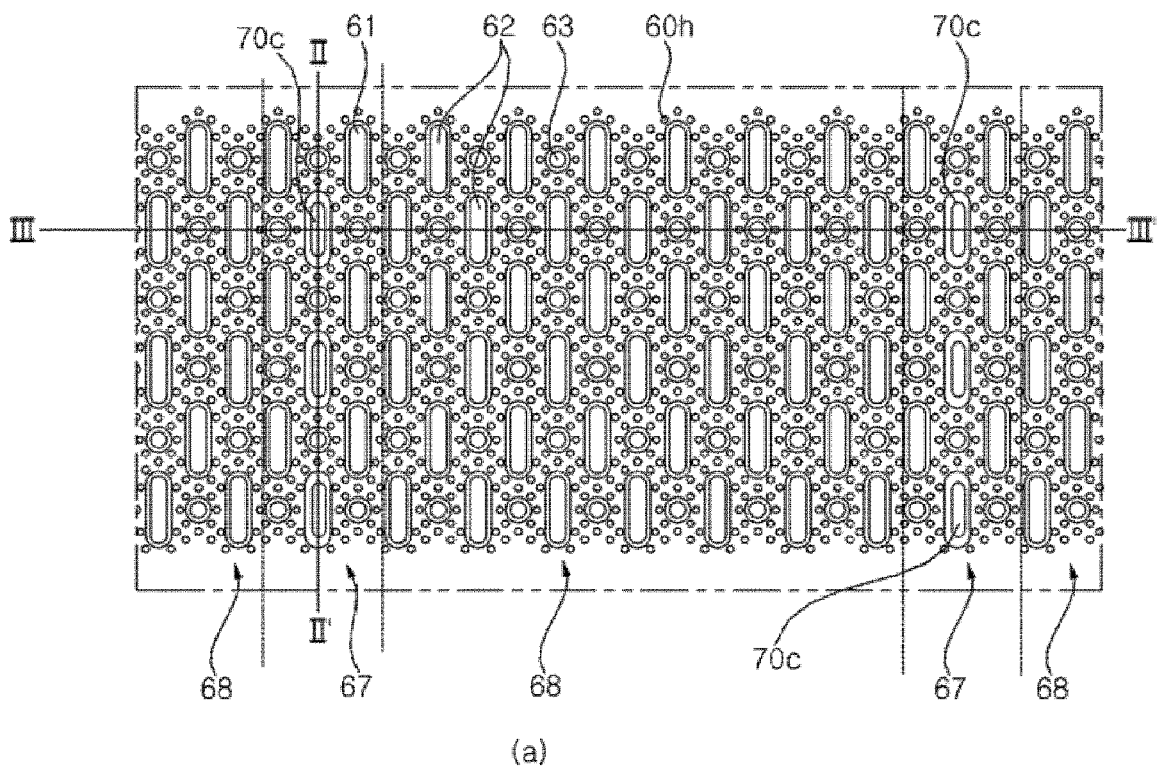
FIG. 7 is a plan view and a cross-sectional view of a developed shape of a drum of a washing machine according to another embodiment of the present disclosure.
Figure 7:
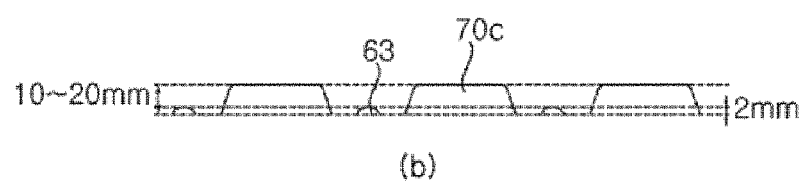
Figure 7:
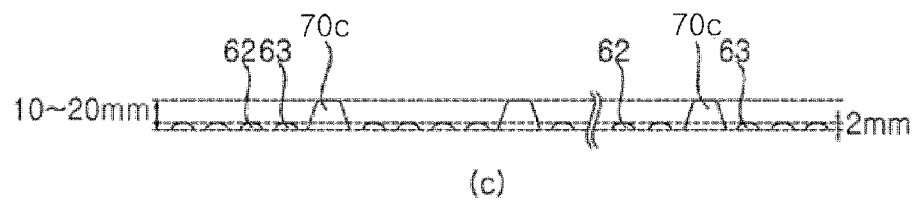

FIG. 6 is a perspective view showing a lifter integrally formed with a drum 60 of a washing machine according to a second embodiment of the present disclosure. FIG. 7 is a plan view and a cross-sectional view showing a developed shape of an inner circumferential surface of the drum of the washing machine according to the second embodiment of the present disclosure.

As shown in FIGS. 6 and 7, the washing machine according to the second embodiment of the present disclosure may include a lifter 70c integrally formed with the drum 60.

Referring to FIGS. 6 and 7, the inner circumferential surface of the drum 60 may be divided into a lifter portion 67 and an embossed portion 68. In the inner circumferential surface of the drum 60, two or more lifters 67 spaced apart from each other at a predetermined interval along a circumferential direction of the drum may be formed. That is, in a case where three lifter portions 67 are formed in the inner circumferential surface of the drum 60, the lifter portions 67 may be disposed to form an angle of 120° relative to each other. As shown in FIG. 6, in the lifter portions 67, a lifter 70c having a height lower than that of the conventional lifter 70a may be formed integrally with the drum 60.

In the washing machine according to the second embodiment, the lifter 70c may be formed in each of a plurality of liter portions 67. The lifter 70c may be formed in plural in the forward-backward direction, and the plurality of lifters 70c may be spaced apart from each other in the forward-backward direction. In addition, the plurality of liters 70c may be formed in a line while spaced apart from each other in the forward-backward direction.

The embossed portion 68 may be formed between the plurality of lifter portions 67. A width of the embossed portion 68 may be greater than a width of the lifter portion 67.

Embossing portions 61, 62, and 63 may be formed in the inner circumferential surface of the drum 60 in order to assist the role of the lifter 70c for lifting laundry and to increase friction between the inner circumferential surface of the drum 60 and the laundry and thereby increase washing power. The embossing portions 61, 62, and 63 may include a first embossing portion 61, a second embossing portion 62, and a third embossing portion 63. The first embossing portion 61, the second embossing portion 62, and the third embossing portion 63 may be formed to have a height lower than that of the lifter 70c. The embossing portions 61, 62, and 63 may be integrally formed with the drum 60.

The lifter portion 67 may include the lifter 70c, and the first embossing portions 61 formed on both left and right sides of the lifter 70c. The first embossing portion 61 may be spaced apart from the lifter 70c. The first embossing portion 61 may be formed on the left and right sides between the lifters 70c are spaced apart from each other in the forward-backward direction. The first embossing portion 61 may be formed at a height lower than that of the lifter 70c. The first embossing portion 61 may have a bottom shape identical to that of the second embossing portion 62, and may have a height higher than that of the second embossing portion 62.

The second embossing portion 62 having a height lower than that of the lifter 70c may be formed in the embossed portion 68. The first embossing portion 61 and the second embossing portion 62 may be formed such that a length thereof in the depth direction of the drum 60 is greater than a width thereof.

At an interval between the lifter 70c and the first and second embossing portion 61 and 62, the third embossing portion 63 may be formed. The third embossing portion 63 may be formed in a circular or polygonal shape, as viewed from above. The third embossing portion 63 may be formed in an octagonal shape, as viewed from above.

The lifter 70c of the washing machine according to the second embodiment of the present disclosure may be formed in a height equal to or higher than 10 mm so as to lift laundry upon rotation of the drum 60 and then drop the laundry therefrom. The higher the height of the lifter 70 is, the greater the force acts on restricting laundry upon rotation of the drum 60. This leads to vulnerability to durability in terms of structure. Therefore, the height of the lifter 70c of the washing machine according to the second embodiment should be equal to or lower than 20 mm.

In addition, in a case where the height of the lifter 70c is higher than 20 mm as does the lifter 70b of the washing machine according to the first embodiment, it is not possible to implement a new motion.

In a case where the height of the lifter 70*c* integrally formed with the drum 760 is 40 mm, durability is vulnerable and a rotational speed of the drum 60 at which a filtration motion starts is the same as the case where the conventional lifter 70*a* is provided.

In a case where the height of the lifter 70*c* is 20 mm and there is a very small quantity of laundry contained in the drum (when the amount of laundry is less than 1 kg), the laundry is attached to the inner circumferential surface of the drum 60 at a rotational speed of 71 rpm and then starts being rotated integrally with the drum 60. In the case where the height of the lifter 70*c* is 20 mm and there is a small quantity of laundry contained in the drum 60 (for example, when the amount of laundry is between 1 kg and 2 kg), the laundry is attached to the inner circumferential surface of the drum 60 at a rotational speed of 56 rpm and then starts being rotated integrated with the drum 60.

In a case where the height of the lifter 70*c* is equal to or lower than 20 mm, when a user washes a small amount of laundry, the washing machine according to the first embodiment of the present disclosure is able to implement a new motion that cannot be implemented by the conventional washing machine. In a case where the height of the lifter 70*c* is higher than 20 mm, the washing machine according to the first embodiment of the present disclosure may restrict a flow of laundry and thus cannot implement a new motion, in the same way as it does when the conventional lifter of 40 mm is given.

However, in a case where the height of the lifter 70*c* is equal to or lower than 50 mm, sufficient friction does not occur between the inner circumferential surface of the drum 60 and the laundry and thus various motions of the laundry are not made. That is, even though the drum 60 is rotated at a speed faster than 56 rpm, the laundry slips at a certain height between the highest point and the lowest point and then flows while shaking upward and downward. In this case, if the rotational speed of the drum 60 is increased even faster, the laundry may be instantly attached to the inner circumferential surface of the drum at about 96 rpm and thus rotated integrated with the drum 60. Since such a flow may significantly degrade washing performance, the height of the lifter 70*c* should be higher than 5 mm.

Likewise to the lifter 70*b* in the first embodiment, a side rake angle of the lifter 70*b* as well as a height of the lifter 70*c* influence in causing a flow of the laundry. Thus, every lift 70*b* disposed in the inner circumferential surface of the drum 60 may be formed at a height between 10 mm and 20 mm. The height of the lifter 70*c* for implementing a rubbing motion may be changed according to an inner diameter of the drum 60, and the height of the lifter 70*c* may be equal to or higher than 2% and equal to or lower than 4.2% of the inner diameter of the drum 60.

The first embossing portion 61 is formed to protrude inward of the drum 60 from the lifter portion 67, and assists the lifter 70*c* to restrict laundry so that laundry flows in accordance with rotation of the drum 60. The first embossing portion 61 may be formed in a height of about 5 mm lower than the height of the lifter 70*c*.

The second embossing portion 62 is formed to protrude inward of the drum 60 from the embossing portion 68 formed in the inner circumferential surface of the drum 60, and increases friction between laundry and the inner circumferential surface of the drum and thereby increases washing power. The second embossing portion 62 may be formed in a height of about 2 mm lower than a height of the lifter 70*c* and a height of the first embossing portion 61.

The third embossing portion 63 is formed to protrude inward of the drum 60 from the entire inner circumferential surface of the drum 60, and increase friction between laundry and the inner circumferential surface of the drum 60 and thereby increases washing power. The third embossing portion 63 may be formed in a height identical to that of the second embossing portion 62.

Figure 8:
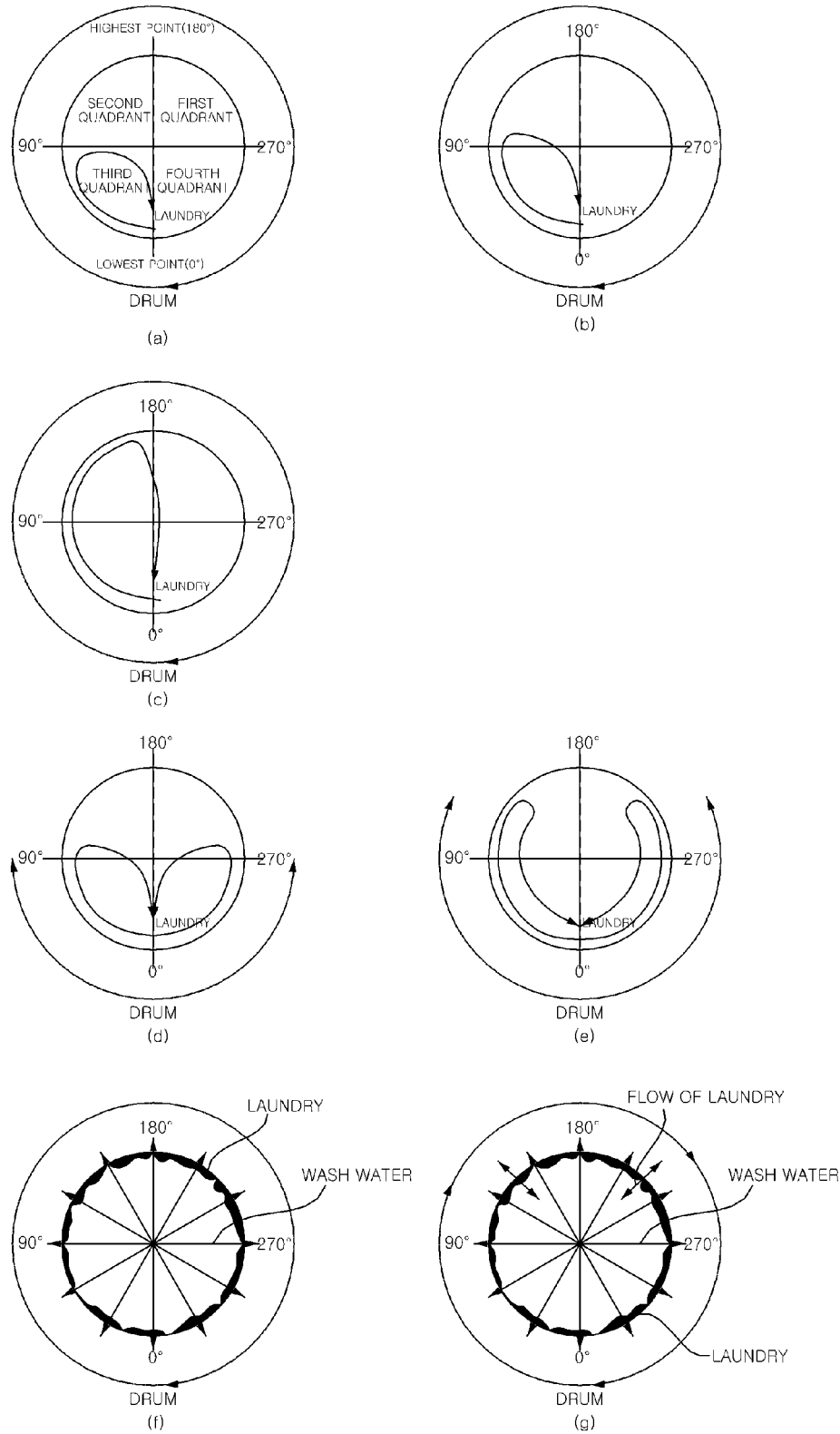
FIG. 8 is a schematic view showing a drum driving motion applied to a conventional washing machine.

FIG. 8 is a schematic view of a drum driving motion which is applied to a control method of a conventional washing machine. Hereinafter, a motion applied to the conventional washing machine will be described with reference to FIG. 8.

FIG. 8(*a*) is a view showing a rolling motion. The rolling motion is a motion in which the washing motor 80 rotates the drum 60 in one direction and makes laundry on the inner circumferential surface of the drum 60 to fall from a point at less than 90° in the rotation direction of the drum 60 to the lowest point in the drum 60. In the rolling motion, the wash motor 80 rotates the drum 60 in one direction at about 40 rpm, and in the case where the drum 60 is rotated in the clockwise direction, the laundry keeps rolling at the third quadrant of the drum 60 when the drum 60 rotates in a clockwise direction.

FIG. 8(*b*) is a view showing a tumbling motion. The tumbling motion is a motion in which the wash motor 80 rotates the drum 60 in one direction and makes the laundry positioned on the inner circumferential surface of the drum 40 to fall toward a lowest point in the drum from a point corresponding to about between 90° and 110° in the rotation direction of the drum 60. In the tumbling motion, the wash motor 80 rotates the drum 60 in one direction at about 46 rpm. In a case where the drum 60 is rotated in a clockwise direction, a part of the laundry may move from the third quadrant of the drum to the second quadrant of the drum 60, may be separated from the inner circumferential surface of the drum 60 and fall toward the lowest point in the drum and lifted again. This kind of laundry flow is repeatedly performed.

FIG. 8(*c*) is a view showing a step motion. The step motion is a motion in which the wash motor 80 rotates the drum 60 in one direction and controls laundry positioned on the inner circumferential surface of the drum to fall from the highest point in the rotation direction of the drum toward the lowest point in the drum. The step motion is controlled such that the wash motor 80 rotates the drum 60 at about 60 rpm, and, if the laundry is positioned nearby the highest point in the drum, the wash motor 80 control to supply a reverse torque to the drum 60. At a time when the drum 60 stops due to the reverse torque, the laundry falls from the highest point to the lowest point. Then, a torque is applied to the drum 60 again so that the laundry positioned at the lowest point in the drum to the highest point.

FIG. 8(*d*) is a view showing a swing motion. The swing motion is a motion in which the washing motor 93 rotates the drum 40 in both directions, and makes the laundry to fall from a position about less than 90° in the rotation direction of the drum 40. The wash motor 80 rotates the drum 60 in the counter-clockwise direction at about 40 rpm, and stops the rotation of the drum 60 before laundry reaches a point in the drum 60 corresponding to about 90° in the counter-clockwise direction, and thereby, the laundry flows toward the lowest point in the drum from the point in the drum 60 at an angle less than 90° in the counter-clockwise direction. Thereafter, the wash motor 80 rotates the drum 60 at about 40 rpm in the clockwise direction, and stops the rotation of the drum 60 before falling laundry reaches a point in the drum at an angle of about 90°, and thereby, the laundry falls toward the lowest point in the drum 60 from the point in the drum 60 at an angle less than about 90° in the clockwise direction.

FIG. 8(*e*) illustrates a view of a step motion. The step motion is a drum motion in which the wash motor 80 rotates the drum 60 in both directions and makes the laundry to drop from a position at an angle of about 90° in the rotational direction of the drum 60. The wash motor 80 rotates the drum 60 at about 60 rpm in the counter-clockwise direction and then temporarily stops the rotation of the drum 60 by providing a reverse torque to the drum 60 after laundry positioned at the lowest point in the drum 60 passes through a point of the drum 60 at about 90° in the counter-clockwise direction. As a result, the laundry positioned on the inner circumferential surface of the drum 60 may suddenly falls from the point of the drum 60 at about 90° in the counter-clockwise direction. Then, the wash motor 80 rotates the drum 60 at about 60 rpm in the clockwise direction, and temporarily stops the rotation of the drum 60 by providing a reverse torque to the drum 60 after the fallen laundry passes through the point of the drum 60 at about 90° in the counter-clockwise direction. As a result, the laundry positioned on the inner circumferential surface of the drum 60 may fall toward the lowest point in the drum from a point in the drum 60 at an angle equal to or greater than 90° in the clockwise direction.

In FIG. 8(*f*) is a view showing a filtration motion. The filtration motion is a motion in which the wash motor 80 rotates the drum 60 at about 60 rpm or more so that the laundry is prevented from being separated from the inner circumferential surface of the drum 60 due to a centrifugal force.

FIG. 8(*g*) is a view of a squeeze motion. The squeeze motion is different from the filtration motion in that the squeeze motion causes laundry to be stuck to the inner circumferential surface of the drum 60 and then separated therefrom by changing a rotational speed of the drum 60.

Since a conventional washing machine has the lifter 70*a* of about 40 mm in height, the drum needs to be rotated at about 40 rpm in order to implement the rolling motion and the swing motion. In the case of rotating the drum at about 60 rpm, a filtration motion the laundry in which laundry rotates along with the drum while stuck to the inner circumferential surface of the drum may be implemented.

A control method of a washing machine configured as above according to the present disclosure will be described as below.

In the washing machine according to an embodiment of the present disclosure, the height of the lifter 70 is lower than the height of the lifter 70*a* provided in the conventional washing machine. Accordingly, in order to implement a filtration motion indicating laundry being along with the drum 60 while attached to the inner circumferential surface of the drum 60, a rotational speed faster than 60 rpm is required. Therefore, various motions different from a motion applied to the conventional washing machine can be implemented in a range higher than a rotational speed required for the conventional washing machine to implement the filtration motion.

Figure 9:
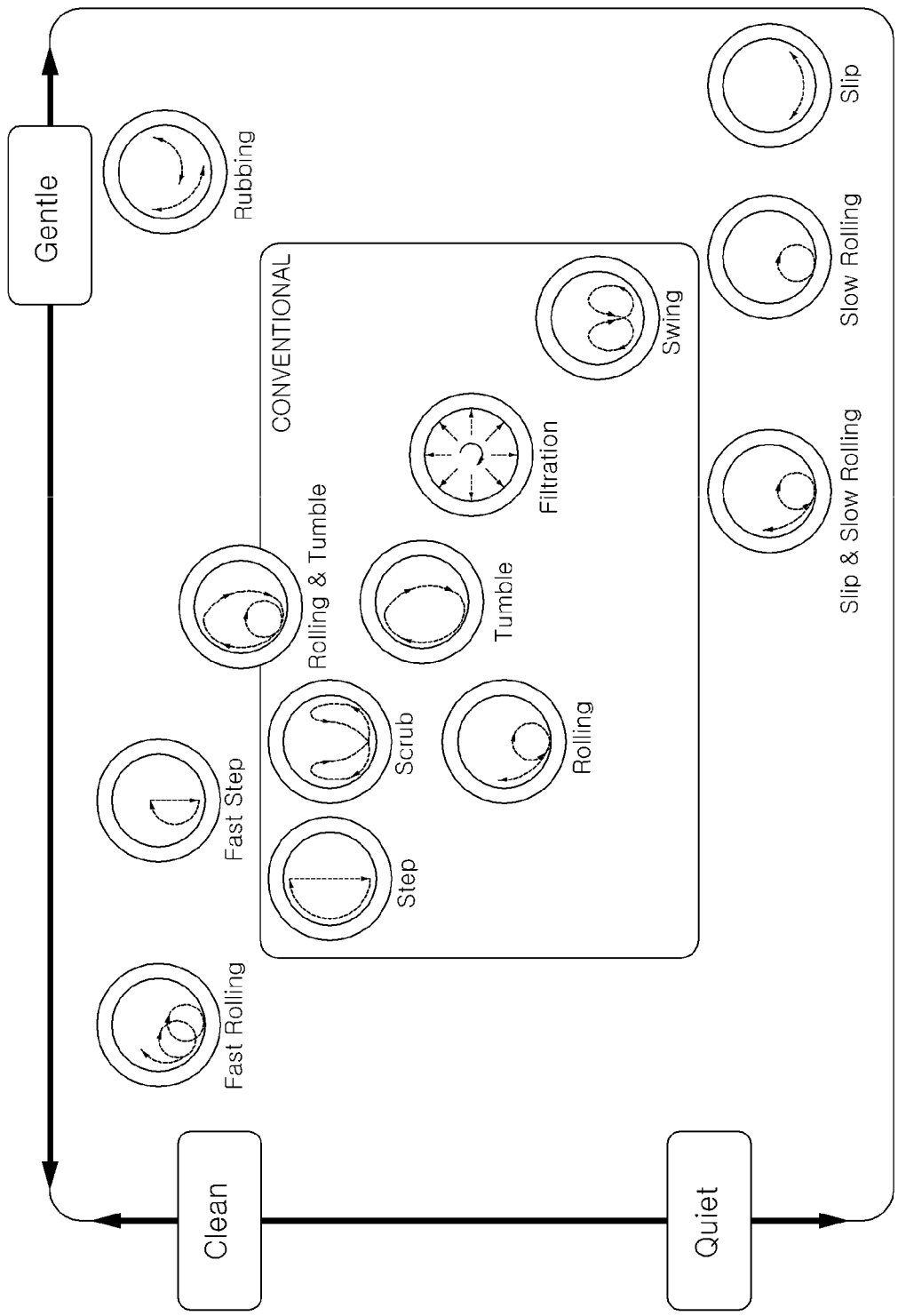
FIG. 9 is a schematic view for comparing washing power and wear and tear of laundry between a motion applied to a conventional washing machine and a motion implementable in a washing machine according to the present disclosure.

FIG. 9 is a graph comparing washing power and a laundry worn-out level between a motion applied to the conventional washing machine and each motion implementable in a washing machine to which an embodiment of the present disclosure can be applied. A horizontal axis is an axis indicating a degree of damage to laundry, and less damage occurs in a rightward direction. A vertical axis is an axis representing washing power or a noise level, and the washing power increases in an upward direction, wherein a stronger washing power reduces a washing time for the same laundry. That is, a motion requiring a fast rotational speed of the drum 60 tends to have a strong washing power and reduce a washing time, but a conventional motion may cause severe damage to laundry.

A control method of a washing machine according to an embodiment of the present disclosure provides a rubbing motion which has a relatively strong washing power while causing less damage to laundry. Referring to FIG. 9, unlike conventional motions distributed from a left top to a right bottom, the rubbing motion causes relatively less damage to laundry while applying a strong washing power and thus the rubbing motion may be positioned at the right top in the graph of FIG. 9.

Hereinafter, the rubbing motion according to an embodiment of the present disclosure will be described with reference to FIGS. 10 to 20.

Figure 10:
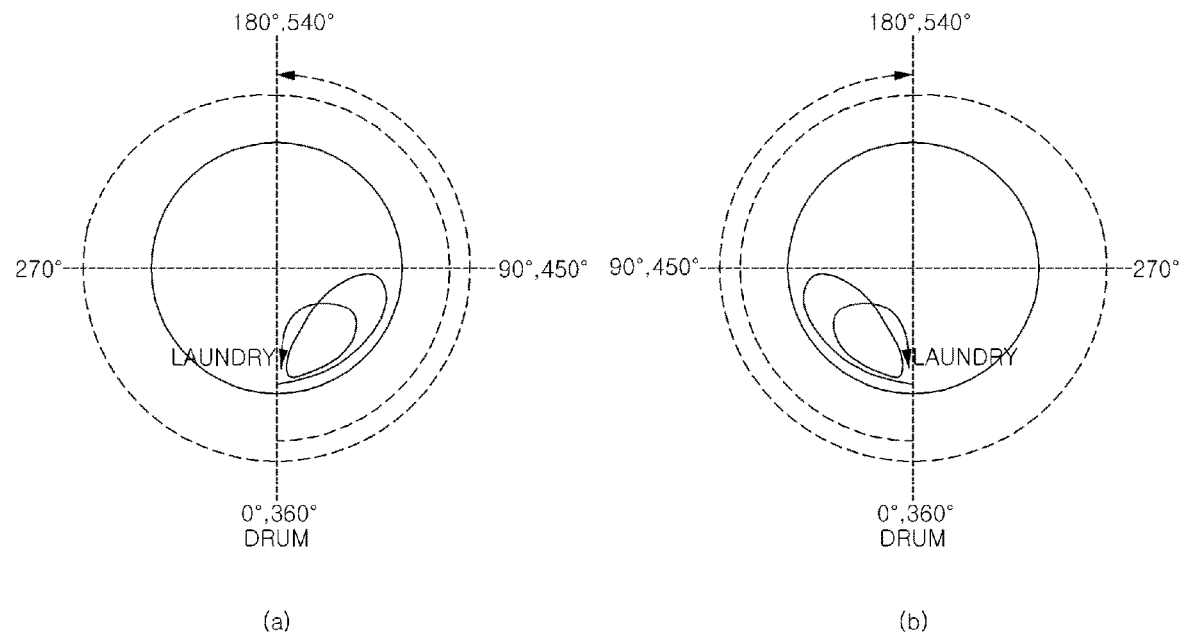
FIG. 10 is a schematic view showing a drum driving motion of a rubbing motion that is applied to a control method for a washing machine according to an embodiment of the present disclosure.

Referring to FIG. 10, the rubbing motion (hereinafter, also referred to as a "rubbing step") is performing a washing operation by rotating the drum 60 bidirectionally. The rubbing motion includes a first rotation step of rotating in a first direction and a second rotation step of rotating in a second direction, and the first rotation step and the second rotation step are performed repeatedly and alternately.

FIG. 10 shows a case where a counter-clockwise direction with the drum 60 viewed from front is referred to the first direction and a clockwise direction with the drum viewed from the front is referred to the second direction, but this is merely an example. That is, the clockwise direction may be the first direction and the counter-clockwise direction may be the second direction as long as the first direction and the second direction are opposite to each other.

Referring to FIG. 10(*a*), at the first rotation step, the drum 60 is rotated one and a half times in the first direction and an operation of lifting and dropping laundry is repeatedly performed at least two times in each rotation step in accordance with rotation of the drum 60. At the first rotation step, the drum 60 is rotated by a preset one-direction rotational angle in the first direction.

At the first rotation step, the drum 60 is rotated in the first direction in a manner in which the drum 60 is rotated at acceleration until reaching a preset target rotational speed and then rotated at the target rotational speed. The first step includes a constant-acceleration rotation step, at which drum 60 is rotated at a constant acceleration until reaching a target rotational speed, and a constant-speed rotation step, at which the drum 60 is rotated constantly at the target rotational speed after the constant-acceleration rotation step. In addition, the first rotation step includes a deceleration step for decelerating the drum 60 being constantly rotated at the target rotational speed until the drum 60 stops. The drum 60 is rotated by the one-direction rotational angle in the first direction over a section for rotation at acceleration until reaching the target rotational speed, a section for rotation at the target rotation speed, and a section for deceleration.

Referring to FIG. 10(*b*), at the second rotation step, the drum 60 is rotated one or more times in the second direction, and laundry goes through a lift-and-fall operation two or more times at each rotation. At the first rotation step, the drum 60 is rotated by a preset one-direction rotational angle in the second direction.

At the second rotation step, the drum 60 is rotated in the first direction in a manner in which the drum 60 is accelerated until reaching a preset target rotational speed and then rotated at the target rotational speed. The first rotation step includes a constant-acceleration rotation step for rotating the drum 60 at a constant acceleration until the drum 50 reaches the target rotational speed, and a constant-speed rotation step of rotating the drum 60 constantly at the target rotational speed after the constant-acceleration rotation step. In addition, the second rotation step include a step for decelerating the drum 60 being rotated constantly at the target rotational speed until the drum 60 stops. The drum 60 is rotated by the one-direction rotational angle in the second direction over a section for rotation at acceleration until reaching the target rotational speed, a section for rotation at the target rotational speed, and a section for deceleration.

Figure 13:
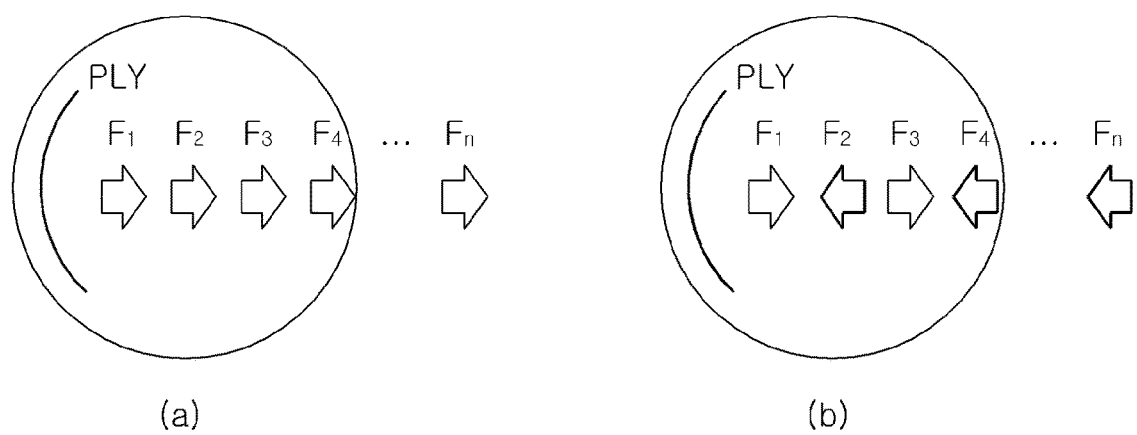
FIG. 13 is a schematic view showing a principle of how laundry is less damaged in a rubbing motion.

Meanwhile, referring to FIG. 13, FIG. 17(b), and FIG. 19(b), the greater the angle by which the drum 60 is rotated in one direction, the greater the washing performance improves and the greater the abrasion of laundry is resulted.

Figure 11:
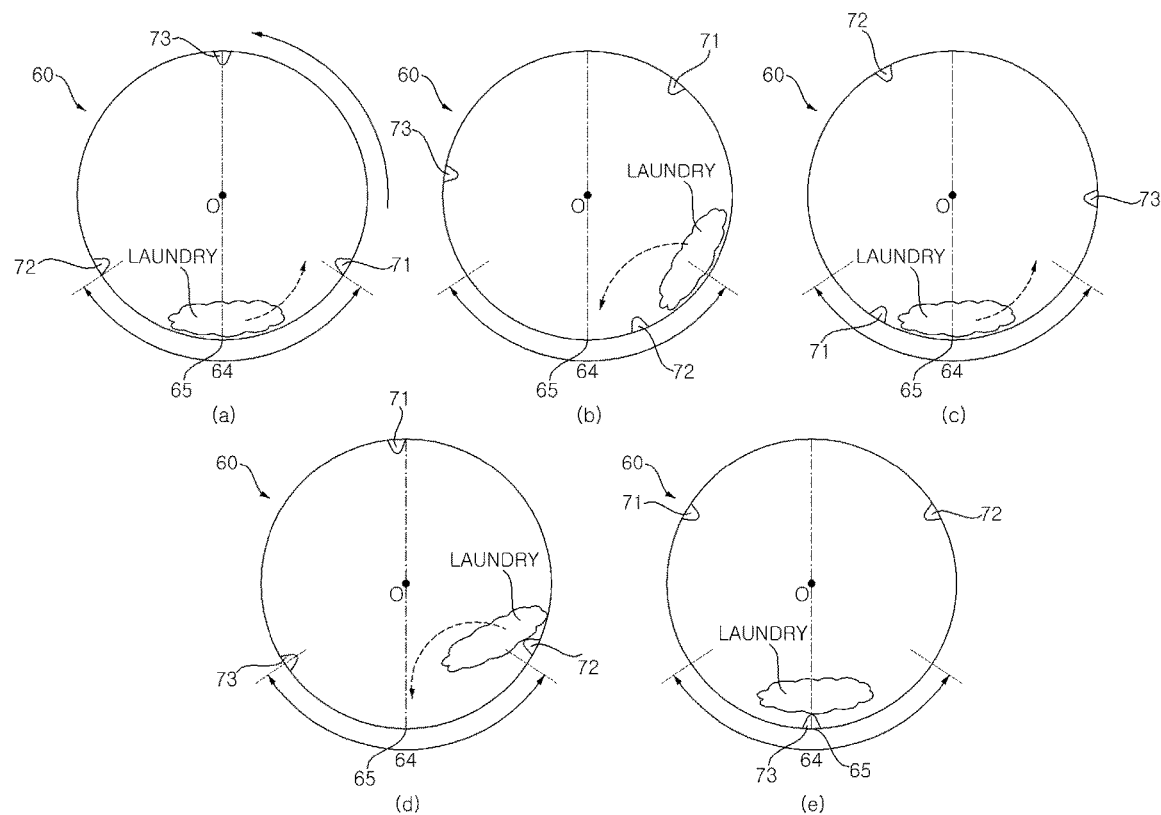
FIG. 11 is a view more specifically showing first directional rotation of a rubbing motion shown in FIG. 10.

In a case where an operation of rotating the drum 60 by less than one time in one direction and rotating the drum 60 by less than one time in the opposite direction is performed repeatedly, lifting and dropping of laundry may be performed once in one direction and only a slip occurs in the inner circumferential surface of the drum 60. Referring to FIG. 11, laundry in a state shown in FIG. 11(a) is lifted by slipping along the inner circumferential surface of the drum 60, falls from a state shown in FIG. (b), and in turn rendered into a state shown in FIG. 11(c). Alternatively, the laundry may be lifted and fall in reverse order. Accordingly, the laundry may just slip or may be lifted to a low height and then fall and go through the same operation repeatedly in both directions, which leads to insufficient washing power.

As shown in FIG. 13(a), if the drum 60 is rotated by more than two times in one direction, tension may applied to laundry in one direction. If tension keeps being applied to the laundry in one direction, the laundry may be stretched and deformed. Accordingly, abrasion of the laundry may increase. In addition, in a case where a ply of a laundry item is released, if intention keeps being applied in one direction, the ply may be pulled in one direction and cause more damage to the laundry item.

When the drum 60 is rotated more than once and less than twice in one direction, lifting and dropping of laundry may be performed two times in each of one direction and the other direction. A direction of force acting on laundry may be changed by the first operation of lifting and dropping the laundry in one direction, washing power may be applied to laundry by the next operation of lifting and dropping of laundry, and then another operation of lifting and dropping the laundry may be performed in the opposite direction, thereby changing the direction of force acting on the laundry.

As shown in FIG. 13(b), in this case, it is possible laundry from being starched as a portion of laundry to which tension is applied is deformed. In addition, even when a ply is released, the play is prevented from being pulled constantly, thereby minimizing releasing of the ply. Accordingly, the rubbing motion renders the drum 60 to be rotated in both directions and thus causes less damage to laundry, compared to the rolling motion which causes the drum to be rotated constantly.

In an embodiment of the present disclosure, an angle of rotation in one direction of the rubbing motion may be set to an angle of rotation by which laundry can be lifted and dropped two times, by taking into consideration washing performance and abrasion of the laundry. The one-direction rotational angle may be in a range between 360° and 720°.

Meanwhile, referring to FIGS. 2, 11, and 12, the drum is in an approximate cylindrical shape, and the lowest point of the drum 60 is located vertically below a rotational center O. The drum 60 and the rotational center O of the drum 60 may be positioned to be inclined downward in a direction from a front toward a rear. A portion which includes the lowest point of the drum 60 and which is located vertically below the rotational center O is defined as a drum lower portion 65.

The drum lower portion 65 is a portion located vertically below the rotational center O of the drum 60, irrespective of rotation of the drum 60. The drum lower portion 65 does not indicate a specific portion of the drum 60 and may change in accordance with rotation of the drum, and a location of the drum lower portion 65 is vertically below the rotational center O of the drum 60.

When the drum 60 is in a stopped state, laundry is placed on the drum lower portion 65 or surroundings thereof due to a force of gravity. An area including the drum lower portion 65 and the surroundings thereof is defined as a first area 64. Accordingly, when the drum 60 is not in a rotating state, laundry is placed on the first area 64 due to a force of gravity.

The first area 64 is an area of which a location is fixed even when the drum 60 such as the drum lower portion 65 is rotated, and which includes the drum lower portion 65. The drum 60 may be divided into the first area 64 and other area, and the first area 64 is an area which is located lower in the two areas (the first area and the other area).

Meanwhile, the first area 64 may be defined in regard with a location of the lifter 70. The washing machine according to an embodiment of the present disclosure may include three or more lifters disposed in the inner circumferential surface of the drum 60. When the drum 60 is in a stopped state, a lifter positioned most adjacent to the drum lower portion 65 in the first direction among the three or more lifters 70 is referred to as a first lifter 71, and a lifter positioned most adjacent to the drum lower portion 65 in the second direction among the three or more lifters 70 is referred to as a second flier 72. That is, with reference to a vertical line passing through the rotational center O of the drum 60, the first lifter 71 may be positioned on one side of the vertical line and the second lifter 72 may be positioned on the other side of the vertical line. The first are 64 may be defined as an area between the first lifter 71 and the second lifter 72 in a state in which the first lifter 71 and the second lifter 72 are located at the above-described positions.

Preferably, in a state in which the first lifter 71 and the second lifter 72 are symmetrical to each other with respect to the vertical line passing through the rotational center O of the drum, as shown in FIG. 11(a), an area between the first lifter 71 and the second lifter 72 may be the first area 64.

Hereinafter, a specific example in which a one-direction rotational angle of the rubbing motion is set to 540° will be described with reference to FIGS. 11 and 12.

Referring to FIG. 11(a), a rubbing motion step may include a step at which the three or more lifters 70 is positioned on an outer side of the first area 64 and laundry is positioned in the first area 64. Before rotation of the drum 60 in the first direction, all of the three or more lifters 70 may be positioned on the outer side of the first area 64. The first lifter 71 may be positioned on the outer side of the first area 64 in the first direction, and the second lifter 72 may be positioned on the outer side of the first area 64. In this state, a lifter at the highest position among the three or more lifters 70 may be a third lifter 73. In this state, the laundry may be positioned in the first area 64 due to a force of gravity.

Referring to FIG. 11(b), in a state in which the three or more lifters 70 are positioned on the outer side of the first area 64 and the laundry is positioned in the first area 64, the drum 60 is rotated at acceleration in the first direction. Accordingly, the laundry is lifted along the inner circumferential surface of the drum 60. In a case where an acceleration gradient in a section for rotation at acceleration in the first direction is sufficient, a rotational speed of the drum 60 may reach a target rotational speed when the laundry is lifted to the highest point (which is a state shown in FIG. 11(*b*)).

In a state where the laundry (or the center of mass of laundry) is spaced apart from the second lifter 72, the drum 60 may be rotated in the first direction and the laundry is not restricted by the lifter, and hence, the laundry may be lifted while slipping from the inner circumferential surface of the drum 60. Accordingly, as the laundry is lifted, a distance between the laundry the second lifter 72 may be gradually reduced.

As the laundry is lifted from the drum lower portion 65, a portion between the laundry and the inner circumferential surface of the drum 60 contact becomes a steep slope, and the laundry falls due to a force of gravity from a point where the laundry is lifted by an angle less than 90° in the first direction. Before the drum 60 is rotated by 180° in the first direction, the laundry is lifted to a point at the angle less than 90° in the first direction and falls therefrom. In the case where the laundry is lifted to a point at the angle less than 90° in the first direction and falls therefrom, a part of the laundry may fall to the drum lower portion while in contact with the inner circumferential surface of the drum 60.

In the washing machine according to an embodiment of the present disclosure, a slip may occur as laundry falls because a height of the lifter 70 is lower than a height of the conventional lifter 70*a*, and thus the laundry may fall in a rolling manner. The slip refers to a flow of laundry slipping from the inner circumferential surface of the drum 60 because there is small friction (restriction) between the laundry and the inner circumferential surface of the drum 60. The rolling of the laundry refers to a motion where the drum 60 and the laundry has different rotation directions and the same rotational speed at a portion of contact between the drum 60 and the laundry when a friction between the laundry and the inner circumferential surface of the drum 60 or restriction applied by the lifter 70 to the laundry is sufficient.

When the laundry falls, the laundry may completely slip without rolling or may completely roll without slipping. However, slipping and rolling of the laundry may occur at the same time.

Meanwhile, before the drum 60 is rotated in the first direction, a magnitude of friction between the laundry and the inner circumferential surface may vary according to a state of how the laundry is positioned inside the drum 60. The greater the magnitude between the laundry and the inner circumferential surface of the drum 60, the less the slip may occur when the laundry is lifted and the greater the distance between the second lifter 72 and the laundry may become when the laundry falls after being lifted. If the distance between the second lifter 72 and the laundry is longer, the laundry may fall with slipping from the inner circumferential surface of the drum 60. If the distance between the second lifter 72 and the laundry is shorter, the laundry may be turned over by the second lifter 72 and the laundry may fall with rolling on the inner circumferential surface of the drum 60.

Referring to FIG. 11(*c*), the drum 60 keeps being rotated in the first direction in the course of the laundry is lifted and falls. In an initial stage where the laundry is lifted or falls, the second lifter 72 passes through the laundry and the laundry may fall slipping and/or rolling. While the laundry falls, the third lifter 73 may pass the first area and be positioned on a side of the first direction, rather than the first area. Accordingly, the laundry may fall in between the first lifter 71 and the third lifter 73. Before the drum 60 is rotated by 180°, laundry lifted from the first area to a point at an angle less than 90° in the first direction may fall to the first area in a state where the drum 60 is rotated by an angle equal to or greater than 180° and less than 360°.

In a state where a part of the laundry is in contact with the first area, the drum 60 keeps being rotated. Since the laundry is not completely placed on the first area, the first lifter 71 may pass through the laundry.

Referring to FIG. 11(*d*), after the first lifter 71 passes through the laundry, the laundry may slip from the inner circumferential surface of the drum 60 and be then lifted by the second lifter 72 in the first direction. In this case, the laundry is lifted with being restricted by the second lifter and thus the laundry may be able to be lifted to a higher point, compared to a case where the laundry is lifted along the inner circumferential surface of the drum 60 (see FIG. 11(*b*). However, even in this case, the laundry may be lifted to a point at an angle less than 90° in the first direction.

The rotational speed of the drum 60 may reach a target rotational speed at least before the second lifting of the laundry in the first direction. Accordingly, at a time when the laundry is lifted by the second lifter 72, the rotational speed of the drum 60 may be the target rotational speed.

Referring to FIG. 11(*e*), while the laundry lifted by the second lifter 72 falls, the drum 60 is rotated at the target rotational speed and stopped to cause the third lifter 73 to be positioned on the first area 64. In a state in which the third lifter 73 is positioned on the first area 64, the laundry may fall on the first lifter 73. In a case where the laundry is lifted to a point at an angle less than 90°, falls therefrom, and then is lifted again along the inner circumferential surface of the drum 60 (see FIG. 11(*b*)), a part of the laundry may fall toward the drum lower portion 65 while in contact with the inner circumferential surface of the drum 60. That is, the laundry falls to the first area 64 with slipping and/or rolling.

At the first rotation step, after the drum 60 is acceleration at acceleration, the drum 60 is rotated at a target rotational speed. Then, the drum 60 is rotated at the target rotational speed, and then the rotation of the drum 60 is decelerated so that the drum 60 is stopped after being rotated by a preset one-direction rotational angle in the first direction. At the first rotation step, the drum is rotated by the one-direction rotational angle through accelerating rotation, constant-speed rotation, and decelerating rotation and stopped, and then the drum 60 immediately enters the second rotation step to be rotated in the second direction.

Figure 12:
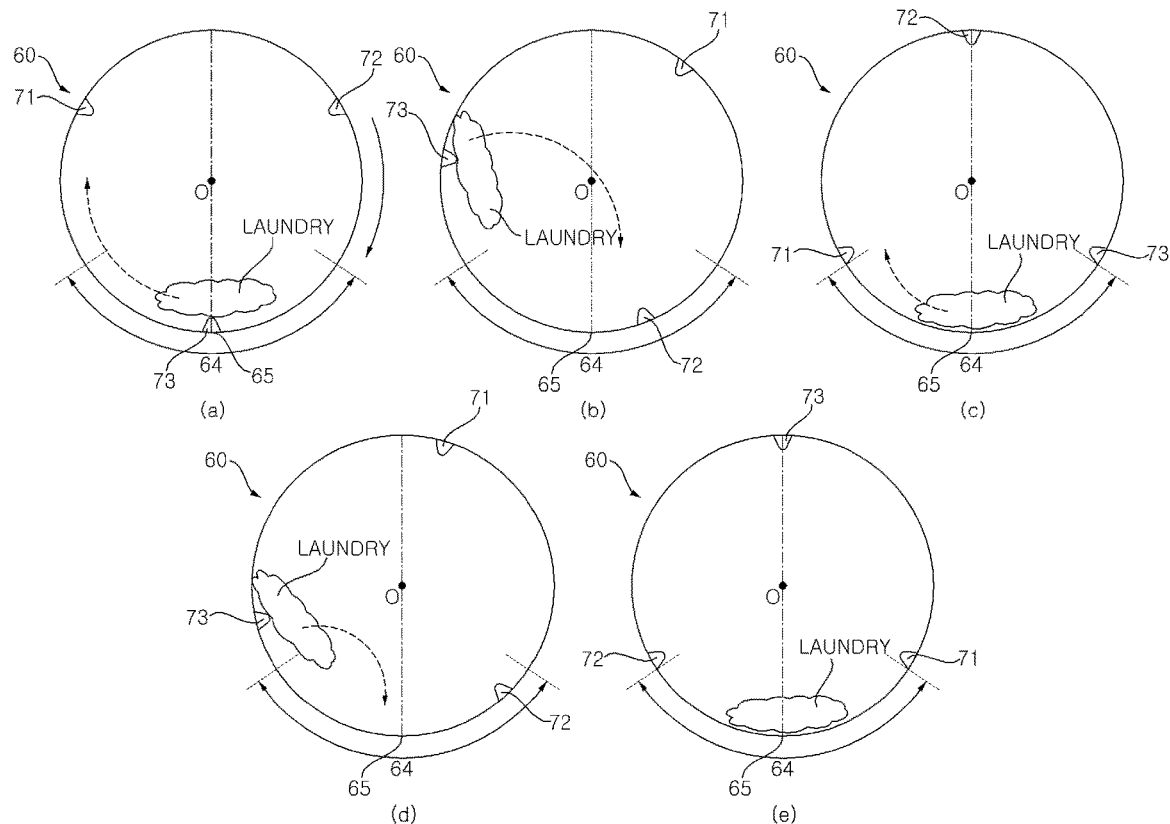
FIG. 12 is a view more specifically showing second directional rotation of a rubbing motion shown in FIG. 10.

Referring to FIG. 12(*a*), before the drum 60 is rotated in the second direction after rotation of the drum 60 one and a half time (which corresponds to 540°) in the first direction, the third lifter 73 may be positioned on the first area 54 and the laundry may be positioned on the third lifter 73.

Referring to FIG. 12(*b*), in a state in which the third lifter 73 is positioned on the first area 65 and the laundry is positioned on the third lifter 73, the drum 60 may be rotated at acceleration and accordingly the laundry may be lifted in the second direction along with the third lifter 73. In this case, the laundry can be lifted to a point at an angle equal to or greater than 90° in the second direction. In a case where the drum 60 is rotated in a state in which the laundry is positioned on the lifter 70, the laundry may be restricted by the lifter 70 and thus the laundry may fall after being lifted to a point higher than when the drum 60 is rotated in a state in which the laundry is positioned on the inner circumferential surface of the drum 60, rather than on the lifter 70.

In a case where an acceleration gradient in a section of rotation at acceleration in the second direction is sufficiently great, a rotational speed of the drum 60 may reach a target rotation ⌐| speed when the laundry reaches the highest point.

When the laundry falls after being lifted from the drum lower portion 65 by an angle equal to or greater than 90°, the laundry may fall while separated from the inner circumferential surface of the drum 60. In this case, the laundry may be distributed during the fall and thus uniformly mixed.

Therefore, when rotation in the second direction is performed after rotation in the first direction, a force acting on laundry changes in direction and entanglement of the laundry is prevented, thereby remarkably reducing damage to the laundry.

Referring to FIG. 12(c), while laundry falls after being lifted by the third lifter 73, the drum 60 keeps being rotated in the second direction, and the second lifter 72 and the first lifter 71 may pass through the first area 64. Accordingly, the laundry may be positioned on the first area and, at the same time, positioned between the first lifter 71 and the third lifter 73.

Referring to FIG. 12(d), the drum 60 keeps being rotated in the second direction, and the laundry is lifted by the third lifter 73 in the second direction after slipping from the inner circumferential surface of the drum 60. In this case, the laundry is restricted and lifted by the third lifter 73, but a force of restriction is less than the state shown in FIGS. 12(a) and 12(b). Thus, the laundry may be at a position lower than in a state in which the laundry is lifted while positioned on the lifter (see FIG. 12(b), and may be lifted to a position higher than in a case where the laundry is lifted along the inner circumferential surface of the drum 60 (see FIG. 11(b). That is, the laundry may be lifted in a direction opposite to a direction shown in FIG. 11(d) and to a position similar to a position shown in FIG. 11(b). Even in this case, the laundry can be lifted to a point at an angle less than 90° in the second direction.

A rotational speed of the drum reaches a target rotational speed at least before the second lifting of the laundry in the second direction. Therefore, a rotational speed of the drum 60 at a time when the laundry is lifted by the third lifter 73 is the target rotational speed.

Referring to FIG. 12€, while the laundry lifted by the third lifter 73 falls, the drum 60 is rotated, and the laundry falls on the first area 64 in a state where the three or more lifters 70 are positioned on the outer side of the first area 64.

The laundry falls after being lifted to a point of an angle less than 90°, and thus, even in this case, a part of the laundry may fall toward the drum lower portion while in contact with the inner circumferential surface of the drum 60. That is, the laundry falls to the first area 64 with slipping and/or rolling.

Referring to FIGS. 11(a) and 12(a), a rotation position of the drum 60 in an initial stage of the first rotation step and a rotation position of the drum 60 in an initial stage of the second rotation step may be reversed. In a case where a one-direction rotational angle is set to an angle in a predetermined range including 540°, this may bring the same effect as that can be achieved when the one-direction rotational angle is set to 540°.

Accordingly, the reverse includes not just a case where a difference between a rotation position of the drum 60 in an initial stage of the first rotation step and a rotation position of the drum 60 in an initial stage of the second rotation step is 180°, but also a case where the lifter 73 at the highest position in the initial stage of the first rotation step is placed on the first area 64 in the initial stage of the second rotation step and thereby there is a difference in angle by which the laundry can be positioned on the lifter 73 positioned on the third area 64. That is, in a case where a difference between a rotation position of the drum 60 in an initial stage of the first rotation step and a rotation position of the drum 60 in an initial stage of the second rotation step is an angle in a predetermined range including 180°.

The predetermined range may be set with reference to an angle (or distance) between two adjacent lifters. The predetermined range is smaller than a size of the first area 64. In addition, the predetermined range is smaller than an angle (or distance) between the two adjacent lifters.

The predetermined range may be a half of an angle between the two adjacent lifters. In a case where the predetermined range is a half of an angle between the two adjacent lifters, the lifter 73 at the highest position in the initial stage of the first rotation step may be positioned on the first area 64 in the initial stage of the second rotation step and the laundry may be positioned on the lifter 73 positioned on the first area 64.

For example, in a case there are three lifters and arranged at the same interval, an angle between two adjacent lifters may be 120° and a half of the angle between the two adjacent lifters may be 60°. Therefore, a difference between a rotation position of the drum 60 in an initial stage of the first rotation step and a rotation position of the drum 60 in an initial stage of the second rotation step may be in a range between 150° and 210°.

At the second rotation step, the drum 60 is rotated at acceleration to a target rotational speed, rotated at the target rotational speed, and then decelerated so that the drum 60 is stopped after being rotated by a preset one-direction rotational angle in the second direction. The drum 60 is stopped after being rotated by the preset one-direction rotational angle through an accelerating rotation, a constant-speed rotation, and decelerating rotation, and immediately enters the first rotation step to be rotated in the first direction.

If the first rotation step and the second rotation step are performed repeatedly and alternately, it is possible to implement a washing processing similar to hand washing. That is, after a part of laundry is rubbed to wash, change a part of the laundry to rub is changed and the changed part of the laundry is rubbed to wash, and, in this manner, it is possible to bring effects similar to that can be achieved when the entire laundry is uniformly rubbed to wash. Therefore, a motion of repeatedly performing the first rotation step and the rotation step may be referred to as a rubbing motion.

Meanwhile, even in a case where the one-direction rotational angle is set to 720°, lifting and dropping of laundry may be performed twice at each of the first rotation step and the second rotation step. Hereinafter, rotation in the first direction and the second direction in a state in which the one-direction rotational angle is set to 720° and laundry is positioned on the inner circumferential surface of the first area 64, rather than on the lifter 70 (see FIG. 11(a)) will be described.

The first rotation step is performed in a manner in which lifting and dropping of the laundry is performed once through the steps shown in FIGS. 11(a) to 11(d) and then the laundry is lifted by the second lifter 72. Next, while the laundry falls with slipping and/or rolling, the drum 60 is rotated in the first direction and thereby the third lifter 73 passes through the first area 64. Accordingly, the laundry can fall in between the first lifter 71 and the third lifter 73.

In a state where a part of the laundry is in contact with the first area 64, the drum 60 may be further rotated. In this case, since the laundry is not completely placed on the first area, the first lifter 71 is allowed to pass through the laundry. The first rotation step is terminated in a state in which the laundry and the lifter are arranged at the same positions as before the rotation in the first direction, and the second rotation step starts immediately.

In a case where the one-direction rotational angle is set to 720°, the second rotation step is performed in a direction opposite to the direction in which the first rotation step is performed, while laundry flows in the same manner in the opposite direction.

Even though the one-direction rotational angle is set to 720°, lifting and dropping of the laundry is repeatedly performed twice at the first rotation step and repeatedly performed twice at the second rotation step.

Hereinafter, there is provide a description about a case in which the one-direction rotational angle is set to 720° and rotation is performed in the first and second directions in a state in which laundry is positioned on the lifter 70 positioned on the first area 64, For convenience of explanation, rotation in a clockwise direction is defined as rotation in the first direction, a lifter positioned on the first area 64 is defined as the third lifter 73, a lifter most adjacent to the third lifter 73 in the first direction is defined as the first lifter 71, and a lifter most adjacent to the third lifter 73 in the second direction is defined as the second lifter 72.

The first rotation step is performed such that laundry is lifted by an angle equal to or greater than 90° in the first direction through the same steps as shown in FIGS. 12(*a*) to 12(*d*), falls therefrom, and is then lifted by the third lifter 73 by an angle less than 90°. Next, while the laundry falls with slipping and/or rolling, the drum 60 may be rotated in the first direction and accordingly the second lifter 72 passes through the first area. Therefore, the laundry may fall in between the second lifter 72 and the first lifter 71.

In a state in which a part of the laundry is in contact with the first area 64, the drum 60 is further rotated in the first direction. In this case, since laundry is not completely placed on the first area 64, the third lifter 73 goes into under the laundry. The first rotation step is terminated in a state in which the laundry and the lifter 70 are arranged at the same positions as before the rotation in the first direction, and the second rotation step is performed immediately.

In a case where the one-direction rotational angle is set to 720°, the second rotation step is performed in a direction opposite to the direction in which the first rotation step is performed, while laundry flows in the same manner in the opposite direction.

Even though the one-direction rotational angle is set to 720°, lifting and dropping of the laundry is repeatedly performed twice at the first rotation step and repeatedly performed twice at the second rotation step.

Meanwhile, in the case where the one-direction rotational angle is set to 720°, a rotation position of the drum 60 in an initial stage of the first rotation step and a rotation position of the drum 60 in an initial stage of the second rotation step may be identical. In a case where the one-direction rotational angle is set to an angle in a predetermined range including 720°, this may bring the same effect as that can be achieved when the one-direction rotational angle is set to 720°.

The predetermined range may be set with reference to an angle (or distance) between two adjacent lifters. The predetermined range is smaller than a size of the first area 64 and smaller than an angle (or distance) between the two adjacent lifters. The predetermined range may be a half of an angle between the two adjacent lifters. That is, a difference between a rotation position of the drum 60 in an initial stage of the first rotation step and a rotation position of the drum 60 in an initial stage of the second rotation step may be equal to or less than a half of a distance by which the two adjacent lifters are spaced apart from each other.

Hereinafter, there is provided a description about an acceleration gradient in a section of rotating the drum 60 in the first and second directions, a target rotational speed, and a decelerating section.

The acceleration relates to washing performance. Referring to FIGS. 11(*c*), 11(*d*), 12(*c*), and 12(*d*), in a case where lifting and dropping of laundry is to be performed twice, at a time when the laundry falls after the first lifting, the drum 60 may be in a state being rotated by an angle equal to or greater than 180° and less than 360°. The second lifting of the laundry is caused by the lifter 70, and, the faster the rotational speed of the drum 60 is, the higher the laundry may be lifted, which leads to improvement in washing performance. Therefore, it is desirable that a rotational speed of the drum 60 reaches to a target rotational speed at least before the second lifting of the laundry.

As described in the following, the target rotational speed may be set to 60 rpm, and the second lifting of the laundry is performed when a rotation position of the drum 60 is in a range between 180° and 360°. Thus, the acceleration at least in the acceleration section may be equal to or greater than a value by which the drum 60 reaches to the target rotational speed when being rotated by 360°. Therefore, an acceleration gradient in an accelerating rotation section may be equal to or less than 30 rpm/s. In an embodiment of the present disclosure, an acceleration gradient in a section for rotation at acceleration is set to 100 rpm/s.

Meanwhile by taking into consideration not just a height for the second lifting of the laundry, but also a height for the first lifting of the laundry and friction between the laundry and the drum 60, washing machine may improve if the acceleration is increased. Accordingly, the acceleration gradient in a section of rotating the drum 60 at acceleration may be set to a maximum value that can be output from the motor 80 that rotates the drum 60.

The target rotational speed may be set by taking into consideration a height of the lifter 70. The faster the target rotational speed is, the more the washing performance may improve. Since the lifter 70 of the washing machine according to an embodiment of the present disclosure is lower in height than the conventional lifter 70*a*, a speed at which a filtration motion starts may be faster than in a washing machine having the conventional lifter 70*a*, wherein the filtration motion is a motion where laundry is rotated integrally with the drum 60 while stuck to the inner circumferential surface of the drum 60 due to rotation of the drum 60.

Accordingly, the target rotational speed may be set to be faster than a speed for a conventional rolling motion and a conventional swing motion. The target rotational speed may be a rotational speed between 56 rpm and 94 rpm. The conventional rolling motion and the conventional swing motion rotate a drum, which has the lifter 70*a* of about 40 mm in height, at about 40 rpm. Thus, since the rubbing motion rotates the drum 60 at a speed faster than the speed for the conventional rolling motion and the conventional swing motion, the rubbing motion may provide strong washing power. A detailed description about the target rotational speed will be provided with reference to FIGS. 15 and 16.

In order to stop the drum 60 rotating at the target rotational speed or rotate the same in the opposite direction, the drum 60 may be decelerated to stop. The washing machine according to an embodiment of the present disclosure may decelerate and brake the drum 60 by applying reversing-phrase braking and/or dynamic braking. The reversing-phase braking is a braking method for braking the wash motor 80, in which a phase of the current being supplied to the wash motor 80 is inverted in order to generate a rotation force in a direction opposite to a rotation direction. The rheostatic braking is a braking method for cutting off a current applied by the wash motor 80 so that the wash motor plays a role of a generator due to rotation inertia.

Figure 14:
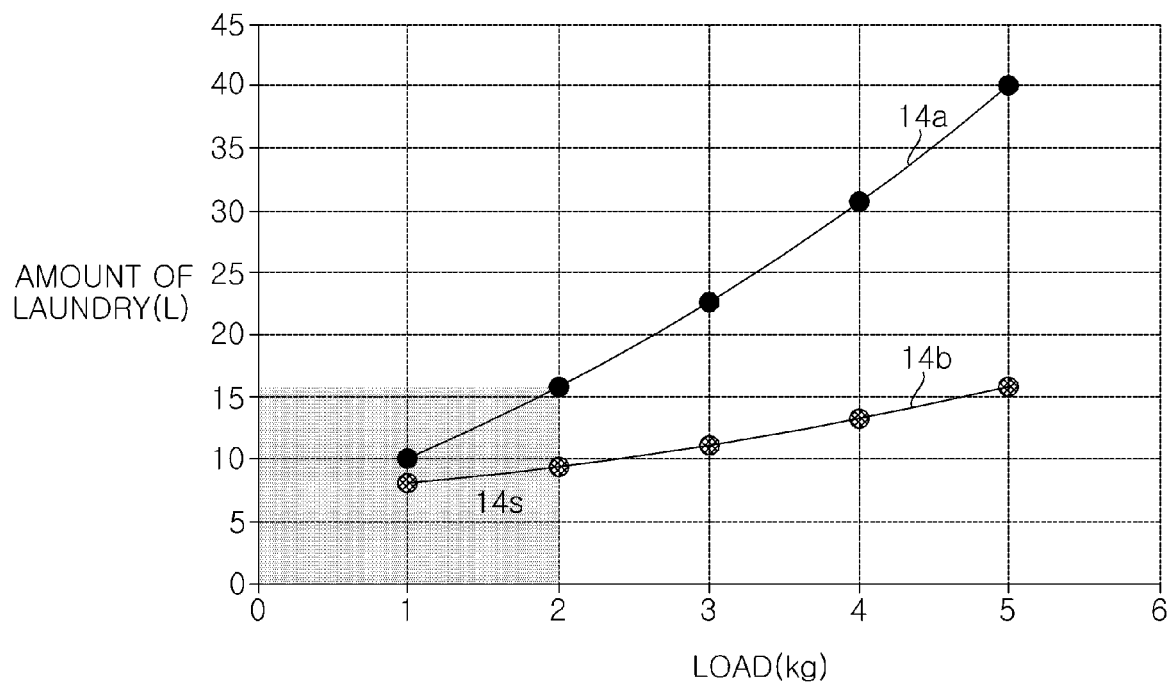
FIG. 14 is a graph showing an amount of supplied water in a control method for a washing machine according to an embodiment of the present disclosure.

Hereinafter, an amount of supplied water required to more efficiently implement a rubbing motion will be described with reference to FIG. 14. FIG. 14 shows that an amount of supplied water 14*a* required to more efficiently implement the rubbing motion is greater than an amount of supplied water 14*b* required for an existing motion.

In order to efficiently implement the rubbing motion, a height level of water supplied to the tub 20 may be higher at least than the drum lower portion 65 and may be determined by an amount of laundry in the drum 60. An amount of supplied water may reach a height that is high enough to an extent where the level of the water can be checked from the outside of the washing machine.

By lowering a height of the lifter 70 compared to a height of a conventional lifter and increasing an amount of supplied water in the rubbing motion compared to an existing motion, it is possible to reduce a restricting force of the lifter 70 with respect to laundry flow. Accordingly, by rotating the drum 60 at a speed faster than the speed for the conventional rolling motion and the conventional swing motion, it is possible to improve washing power physically. In addition, water is supplied to a level higher than the drum lower portion 65, and, if laundry is sufficiently wet by detergent-mixed water, it is possible to improve washing power chemically.

For example, in order to efficiently perform the rubbing motion, in a case where an amount of laundry is 1 kg, about 12 L of water may be supplied. In a case where an amount of laundry is 2 kg, about 16 L of water may be supplied. In a case where an amount of laundry is 3 kg, about 24 L of water may be supplied. In a case where an amount of laundry is 5 kg, about 40 L of water may be supplied.

In order to implement a motion applied to a conventional washing machine, it was necessary to supply about 8 L of water for 1 kg of laundry and about 16 L of water for 5 kg of laundry. The rubbing motion can be smoothly implemented by supplying a more amount of water compared to the above case. That is, conventionally, an amount of water three to eight times more than an amount of laundry needed to be supplied, and an amount of water eight to twelve times more than an amount of laundry needed to be supplied in order to implement the rubbing motion smoothly.

The rubbing motion may require a more amount of water than a conventional motion when the same amount of laundry is given. In addition, the drum 60 is rotated faster to implement the rubbing motion, and thus, the rubbing motion may lead to a great load to the wash motor 80. Accordingly, the rubbing motion can be performed effectively when there is a small amount of laundry, and, especially when laundry is a small quantity being less than 2 kg (14 s), the effect of the rubbing motion may be maximized. The rubbing motion can be implemented when an amount of laundry is equal to or less than 5 kg. Accordingly, the amount of laundry is sensed at a laundry quantity sensing step, and a control operation may be performed such that the rubbing motion is implemented when the sensed amount of laundry is equal to or less than 5 kg. Accordingly, when the amount of laundry sensed in the laundry quantity sensing step is equal to or less than 5 kg, the rubbing motion is implemented in a washing cycle, and, when the amount of laundry is equal to or greater than 5 kg, a general motion of rotating the drum 60 in one direction may be implemented in the washing cycle. The general motion refers to implementing the washing cycle with a conventional tumbling motion, a conventional rolling motion, etc.

Figure 15:
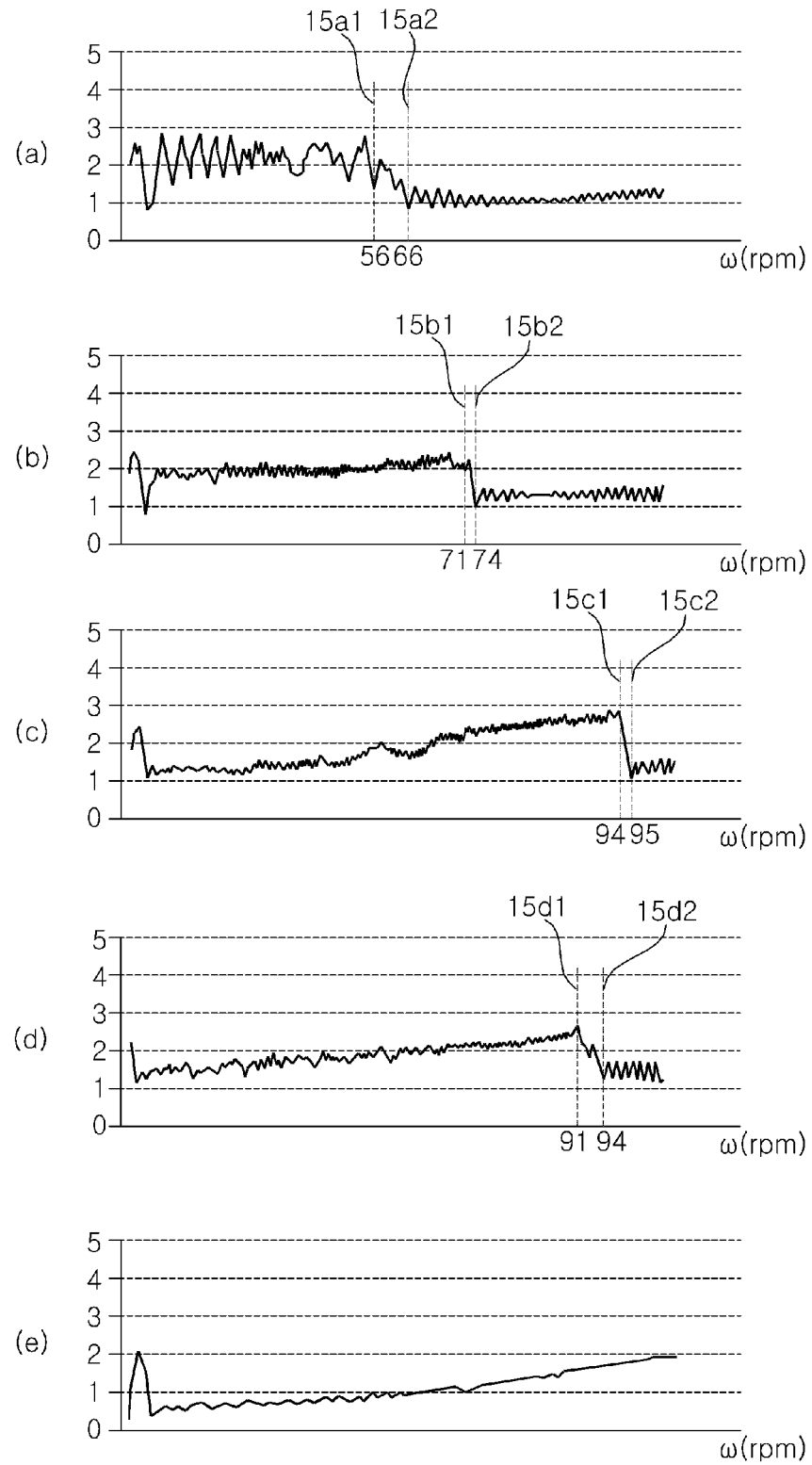
FIG. 15 is a graph showing a current value which is applied to a motor at any of various heights of the lifter according to a rotational speed of the drum when an amount of laundry is a very small quantity.
Figure 16:
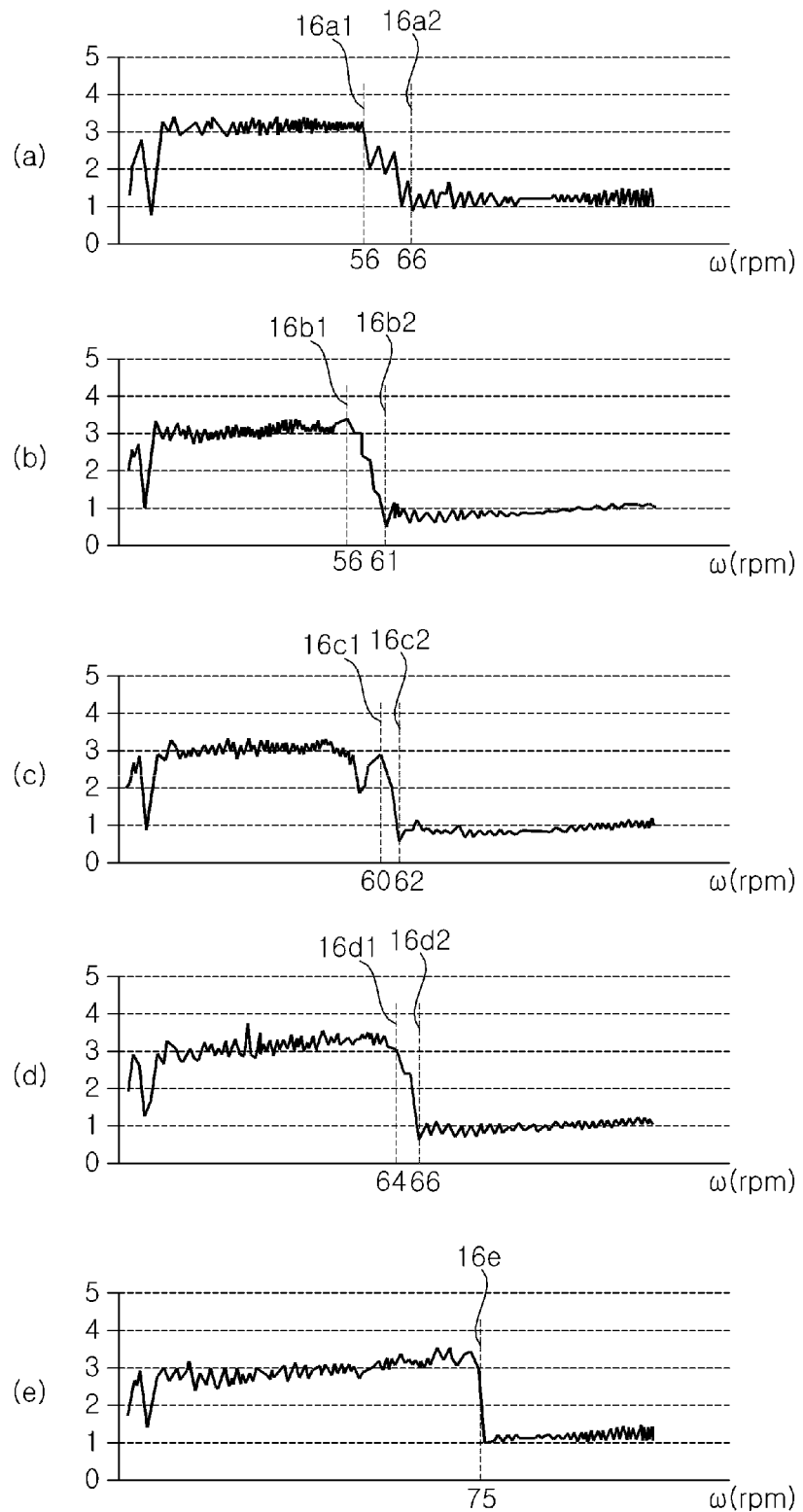
FIG. 16 is a graph showing a current value which is applied to a motor at any of various heights of the lifter according to a rotational speed of the drum when an amount of laundry is a small quantity.

FIGS. 15 and 16 are graphs showing a current applied to the wash motor 80 while a rotational speed ω of a drum is increased at a constant gradient. Hereinafter, the height of the lifter 70 and the rotational speed ω of the drum will be described with reference to FIGS. 15 and 16.

FIG. 15 is a graph showing a case where, when there is a very small quantity (less than 1 kg), a current is applied to the wash motor 80 and a rotational speed ω of a drum is increased constantly, and the lifter 70 is given at different heights. FIG. 16 is a graph showing a case where, when there is a small quantity (between 1 kg and 2 kg), a current is applied to the wash motor 80 and a rotational speed ω of a drum is increased constantly, and the lifter 70 is given at different heights. FIG. 15(*a*) and FIG. 16(*a*) are graphs showing a current applied to the wash motor 80 while the rotational speed ω of the drum is increased constantly when the lifter 70 is 40 mm in height. FIG. 15(*b*) and FIG. 16(*b*) are graphs showing a current applied to the wash motor 80 while the rotational speed ω of the drum is increased constantly when the lifter 70 is 20 mm in height. FIG. 15(*c*) and FIG. 16(*c*) are graphs showing a current applied to the wash motor 80 while the rotational speed ω of the drum is increased constantly when the lifter 70 is 15 mm in height. FIG. 15(*d*) and FIG. 16(*d*) are graphs showing a current applied to the wash motor 80 while the rotational speed ω of the drum is increased constantly when the lifter 70 is 10 mm in height. FIG. 15(*e*) and FIG. 16(*e*) are graphs showing a current applied to the wash motor 80 while the rotational speed ω of the drum is increased constantly when the lifter 70 is 5 mm in height (or when there is no lifter while a first embossing portion of 5 mm in height is given).

If the rotational speed ω of the drum 60 is increased, magnitude of a current may fluctuate at a certain value or may fluctuate while gradually increasing. In this section, a rolling motion, a tumbling motion, etc. may be implemented.

A current value may be remarkably reduced at a specific rotational speed ω. A value on a horizontal axis at a point (15*a*1, 15*b*1, 15*c*1, 15*d*1, 16*a*1, 16*b*1, 16*c*1, 16*d*1, and 16*e*) where the current value starts decreasing is a rotational speed ω at which laundry starts being stuck to the inner circumferential surface of the drum 60. Since the laundry flows inside the drum 60, a great force is required for rotation of the drum 60. Once the laundry starts being stuck to the inner circumferential surface of the drum 60, a current value decreases because there is no reaction to the force that causes the laundry 60 to flow.

The current value decreases and then fluctuates at a certain value. In this section, the filtration motion may be implemented. A value on the horizontal axis at a point (15*a*2, 15*b*2, 15*c*2, 15*d*2, 16*a*2, 16*b*2, 16*c*2, 16*d*2, and 16*e*) where the significant reduction in the current value is completed is a rotational speed ω) at which the drum 60 is rotated with all the laundry stuck to the inner circumferential surface of the drum 60.

If a height of the lifter 70 is reduced than a height of the conventional lifter, a rotational speed ω at which the laundry starts being stuck to the inner circumferential surface of the drum 60 and a rotational speed ω at which the filtration motion is implemented with all the laundry stuck to the inner circumferential surface of the drum 60 are increased, and this phenomenon may be called a filtration shift phenomenon. Accordingly, a new motion may be implemented in a section between a rotational speed ω of 56 rpm at which laundry starts being stuck to the inner circumferential surface of the drum 60 in a washing machine having a lifter in height of about 40 mm and a rotational speed ω at which laundry starts being stuck to the inner circumferential surface of the drum 60 in a washing machine having the lifter 70 in height equal to or lower than 20 mm.

In a case where the height of the lifter 70 is 15 mm, the laundry starts being stuck to the inner circumferential surface of the drum 60 at 94 rpm, and thus, a new motion may be implemented at a rotational speed ω equal to or greater than 56 rpm and equal to or less than 94 rpm. Accordingly, a target rotational speed for the aforementioned rubbing motion in the washing machine having the lifter 70 in height equal to or less than 20 mm may be equal to or greater than 56 rpm and equal to or less than 94 rpm.

Meanwhile, FIG. 15(*e*) does not show a section where a current value decreases, as described above. This means that, in a case where the height of the lifter 70 is equal to or less than 5 mm, laundry does not flow in accordance with rotation of the drum 60 and instead the laundry slips from a specific height in a rotational direction of the drum 60. This happens even when the height of the lifter 70 is equal to or less than 5 mm. Therefore, the height of the lifter 70 may be greater than 5 mm. As described above, the height of the lifter 70 may be equal to or greater than 10 mm by taking into consideration of a side rake angle of the lifter 70.

Therefore, every lifter 70*b* disposed on the inner circumferential surface of the drum 60 may be in height between 10 mm and 20 mm.

The target rotational speed may be equal to or greater than 56 rpm and equal to or less than 94 rpm. Preferably, when an amount of laundry is a small quantity, the target rotational speed may be equal to or greater than 56 rpm, which is a rotational speed 16*b*1 at which laundry starts being stuck to the drum when the height of the lifter is 20 mm, and may be equal to or less than 64 rpm, which is a rotational speed at which laundry starts being stuck to the drum when the height of the lifter is 100 mm.

Figure 17:
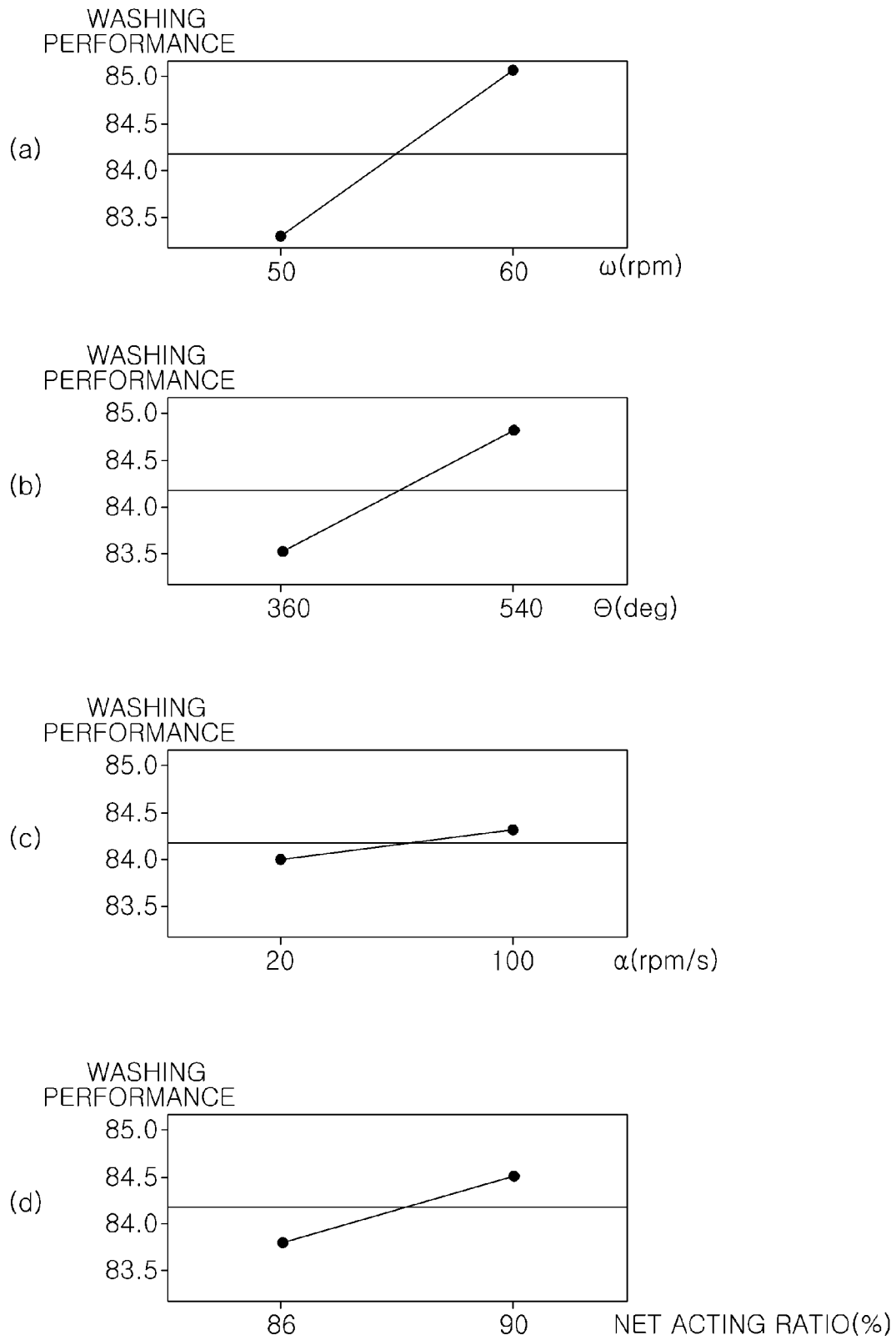
FIG. 17 is a graph showing washing performance according to change in a rotational speed of a drum, a rotational angle, a rotational acceleration gradient, and a net acting ratio.
Figure 18:
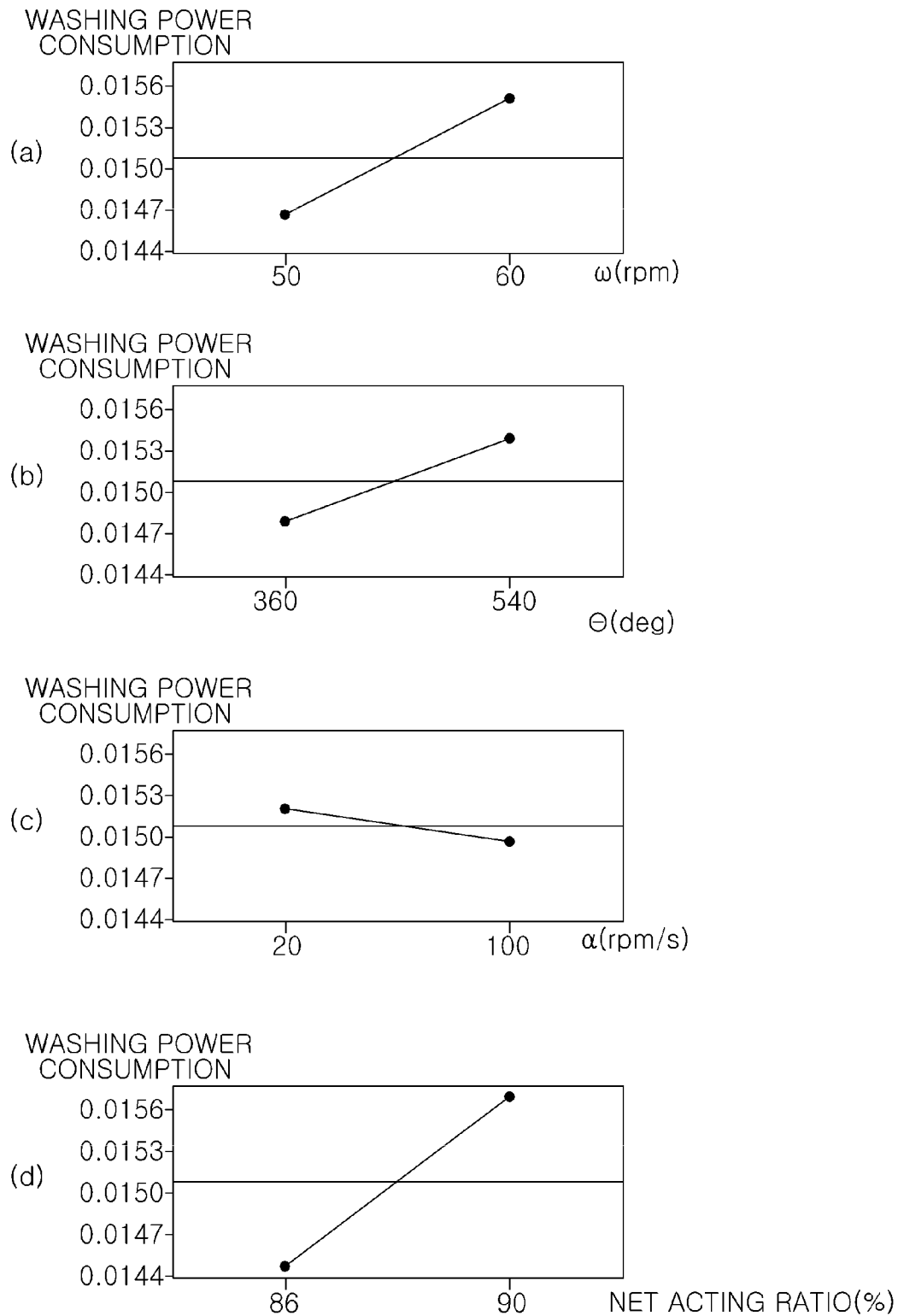
FIG. 18 is a graph showing washing power consumption according to change in a rotational speed of a drum, a rotational angle, a rotational acceleration gradient, and a net acting ratio.
Figure 19:
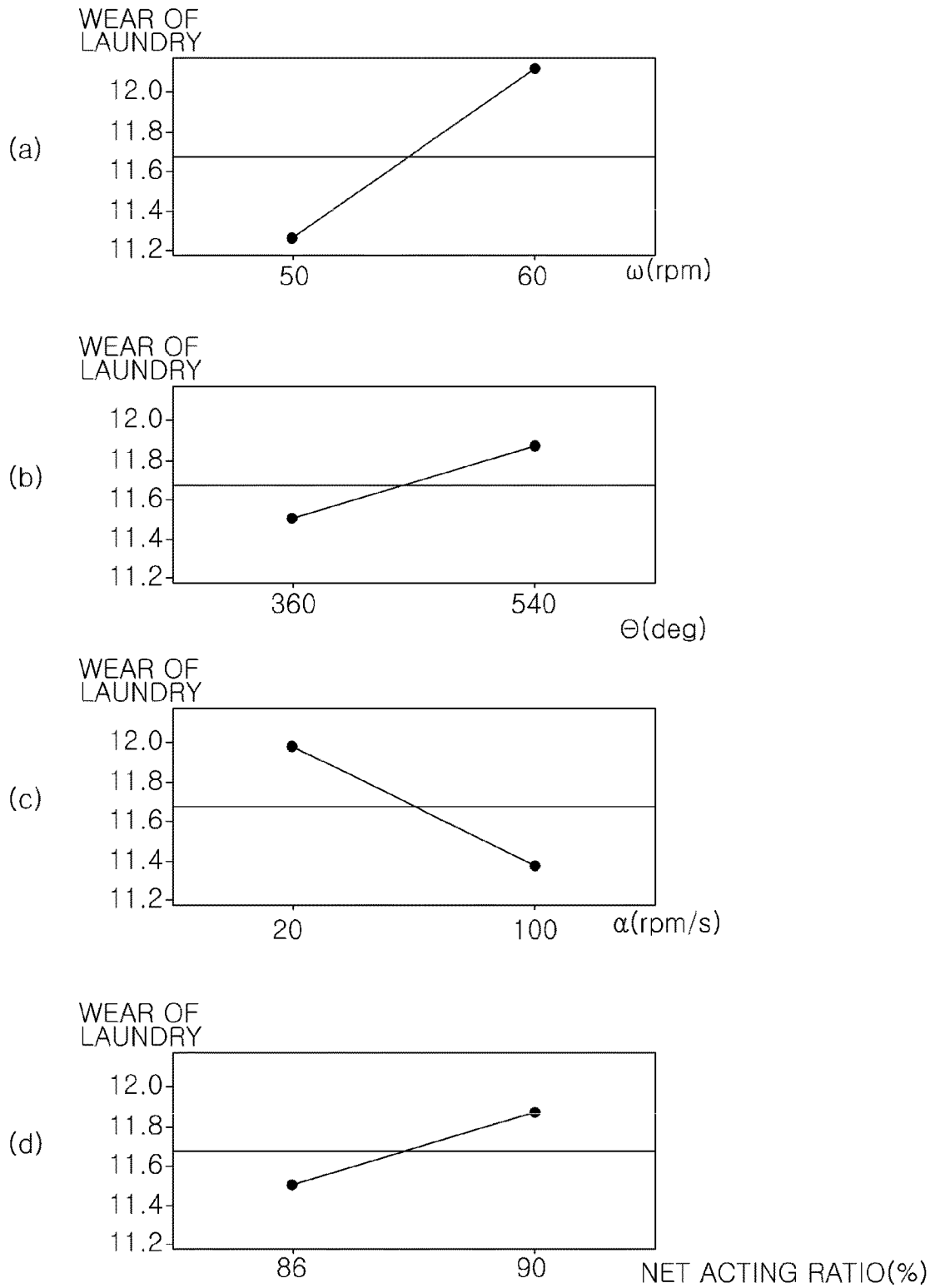
FIG. 19 is a graph showing a degree of damage to laundry according to change in a rotational speed of a drum, a rotational angle, a rotational acceleration gradient, and a net acting ratio.

Hereinafter, a control factor of the rubbing motion will be described with reference to FIGS. 17, 18, and 19. The control factor of the rubbing motion may take into consideration a rotational speed ω of the drum, a one-direction rotational angle θ, an acceleration gradient α, an accelerating rotation section of rotation, and a net acting ratio.

If the rotational speed ω of the drum increases, the washing performance may improve but washing power consumption and laundry abrasion increase. The one-direction rotational angle θ has the same tendency as that of the rotational speed ω. Meanwhile, if the acceleration α increases, washing performance improves and washing power consumption and laundry abrasion decreases, and therefore, a greater acceleration α has more advantageous effects.

The net acting ratio refers to a ratio of an ON-time of the wash motor 80 to a sum of the ON-time and the OFF-time of the wash motor 80. If the net acting ratio increases, it takes a longer time to perform a washing operation compared to the same washing time, and thus, the net acting ratio has the same tendency as that of the rotational speed ω.

The rotational speed ω may be set to be equal to or greater than 56 rpm in order to improve washing performance compared to a rolling motion applied to a conventional washing machine. However, if the rotational speed ω is set to be excessively faster by taking into consideration only washing performance, it gives negative effects on washing power consumption and laundry abrasion. Therefore, the rotational speed ω may be set to 60 rpm.

The one-direction rotational angle θ may be set to be equal to or greater than 360° in order to improve washing power compared to a conventional swing motion, and the one-direction rotational angle θ may be set to be less than 720° by taking into consideration of washing power consumption and laundry abrasion, similarly as in the description about the rotational speed ω.

In a case where the one-direction rotational angle θ is set to 540°, a rotation position of the drum 60 in the initial stage of the first rotation step and a rotation position of the drum in the initial stage of the second step may be reversed. In this case, as described above, one of the first rotation step and the second rotation step may include a section where laundry is rotated while positioned on the lifter 70, has an effect of distributing the laundry. Therefore, the one-direction rotational angle may be set to 540°.

The acceleration α may be set to be equal to or greater than 30 rpm/s, as described above. In addition, if the acceleration α increases, washing performance may improve and washing power consumption and laundry abrasion may decrease, and therefore, the acceleration α may be set to a maximum value for controlling the wash motor 80. In the present embodiment, the acceleration α is set to 100 rpm/s.

The controller 90 may rotate the drum 60 in the first direction and in the second direction alternately and repeatedly a predetermined number of times, and then may temporarily stop operation of the wash motor 80 so that the net acting ratio has a preset value. The net acting ratio may be set to be equal to or higher than 86% by taking into consideration washing performance, and the net acting ratio may be set to 90% by taking into consideration washing power consumption and laundry abrasion, in the same manner regarding the rotational speed ω.

Figure 20:
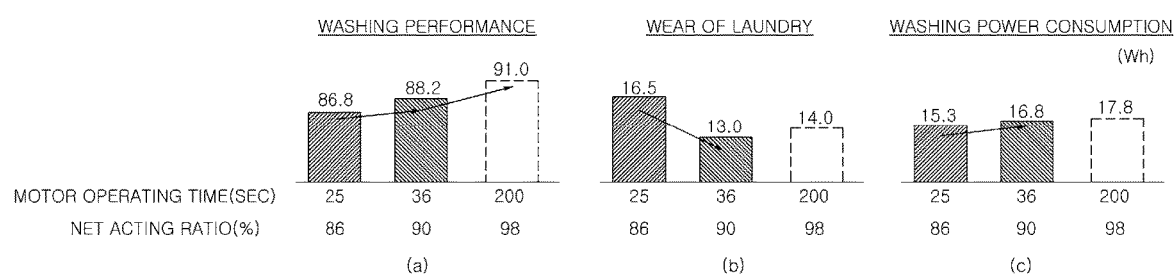
FIG. 20 is a graph showing washing performance, laundry abrasion, the lesion abrasion, and power consumption when a net acting ratio is set differently for a predetermined washing time.

Hereinafter, a net acting ratio and a motor operating time will be described with reference to FIG. 20. FIGS. 17(*d*), 18(*d*), and 19(*d*) are data of experiments in which an operation stopping time of a motor is set to a constant value, and in which a motor is operated for a motor operating time of which a net acting ratio is 86% and 90%. FIG. 20 is data of experiment in which a predetermined washing time and a predetermined operation stopping time of motor are set, an operation time of the motor is set to cause a net acting ratio to become 86%, 90%, and 98%, and the motor is operated and stopped repeatedly over the washing time. Accordingly, washing performance, laundry abrasion, washing power may have different data with respect to the same net acting ratio.

If the wash motor 80 operates continuously, washing power consumption may increase and temperature of the wash motor 80 and a driver 82 may increase excessively. In order to prevent this problem, the controller 90 may set the wash motor 80 to operate for a first time period and temporarily stopped for a second time period.

In order to prevent overheating of the motor 80 and the driver 82 and excessive increase in the washing time, the second time period may be set to 4 seconds. FIG. 20(*b*) shows that, in a case where a time for temporarily stopping the motor is set to about 4 seconds, a degree of laundry abrasion is reduced when a net acting ratio is 90% and 98%, rather than when the net acting ratio is 86%.

Accordingly, the second time period may be set to 4 seconds, and, if the first time period is set to 25 seconds, the net acting ratio is 86%. In a case where the first time period is set to 36 seconds, the net acting ratio is 90%. In a case where the first time period is set to 200 seconds, the net acting ratio may be 98%. The net acting ratio may be set to between 86% and 98%, by taking into consideration washing power. The net acting ratio may be set to between 90%, by taking into consideration laundry abrasion and washing power consumption.

Referring to FIGS. 2 and 21, the washing machine according to an embodiment of the present disclosure may include a nozzle 47 configured to spray water, discharged from the tub 20 (hereinafter, referred to as "circulation water"), into the drum 60. The washing machine may include the gasket 40, which forms the laundry loading hole 12 between the casing 10 and the tub 20, and a circulation water supply pipe 45 disposed on an outer circumferential surface of the gasket 40 to supply the circulation water to the nozzle 47. The nozzle 47 may include one or more nozzles.

The circulation water discharged from the tub 20 may be pumped by a pump 30, supplied to the nozzle 47 through the circulation water supply pipe 45, and then sprayed into the drum 60 after passing through the nozzle 47. When a washing operation is performed as the drum 60 is rotated, the circulation water may be sprayed into the drum 60 through at least one nozzle 47.

Figure 22:
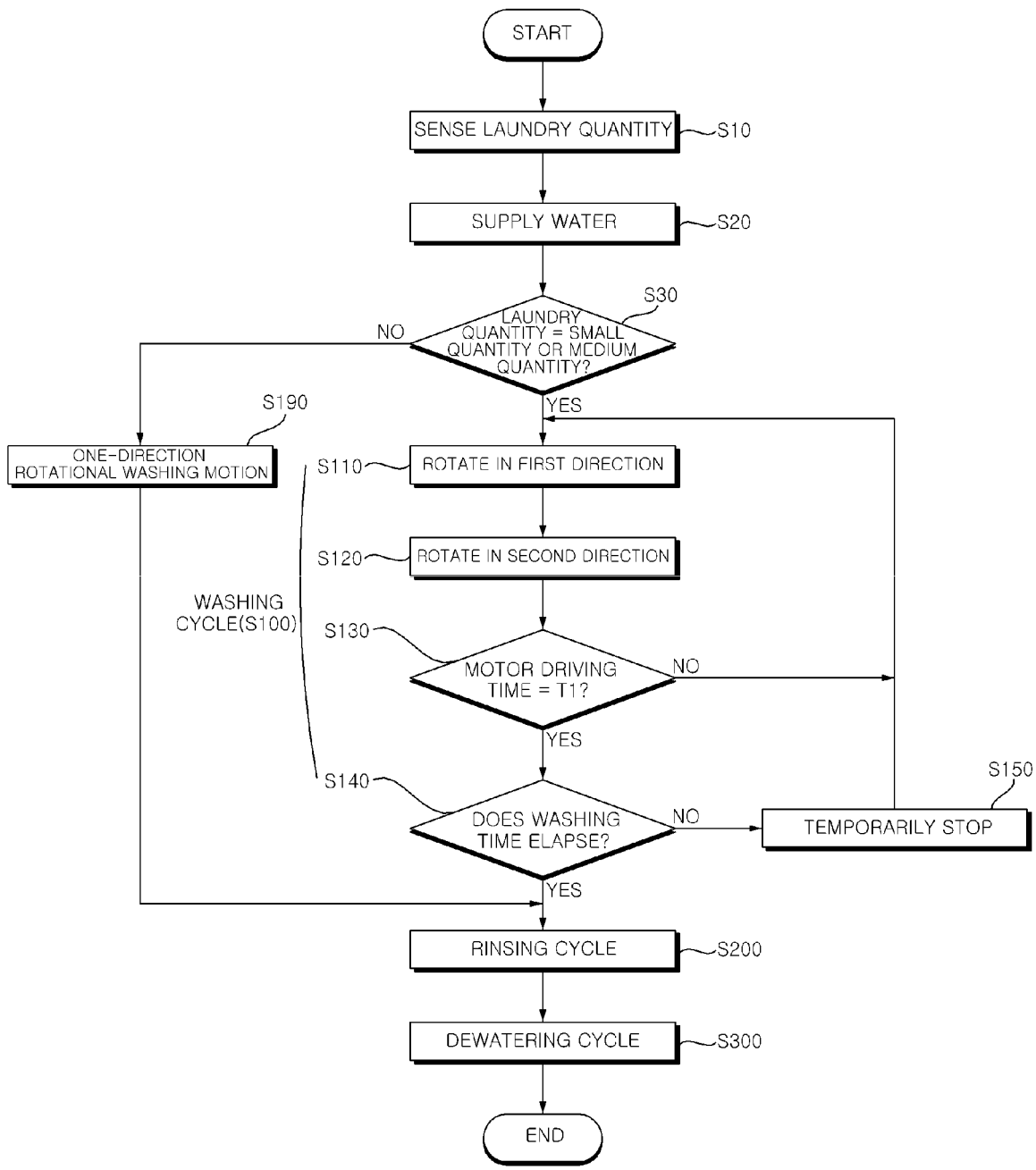
FIG. 22 is a flowchart showing a control method for a washing machine according to an embodiment of the present disclosure.

Hereinafter, a control method for a washing machine according to an embodiment of the present disclosure will be described with reference to FIG. 22.

First, after the laundry is loaded into the drum 60 and the washing machine operates, a laundry quantity is sensed (S10). Various algorithms may be used to sense a laundry quantity, and there are various well-known laundry quantity sensing techniques, and thus a detailed description thereof is herein omitted.

Water is supplied into the tub 20 according to the sensed laundry quantity (s20). A level of supplied water may be higher than at least the drum lower portion 65. An amount of supplied water may be eight to twelve times of the sensed laundry quantity. For example, in order to efficiently perform the rubbing motion, in a case where an amount of laundry is 1 kg, about 12 L of water may be supplied. In a case where an amount of laundry is 2 kg, about 16 L of water may be supplied. In a case where an amount of laundry is 3 kg, about 24 L of water may be supplied. In a case where an amount of laundry is 5 kg, about 40 L of water may be supplied.

After water is supplied into the tub 20, a washing motion for washing laundry is determined based on the sensed laundry quantity (S30). When the sensed laundry quantity is equal to or less than a preset amount, the rubbing motion is selected. When the send laundry quantity is greater than the preset amount, a tumbling motion, a rolling motion, or the like which rotates the drum 60 in one direction is selected.

Being equal to or less than the preset amount may refer to a case where a laundry quantity is a small quantity (including a very small quantity) or a vast quantity. The case where the laundry quantity is a small quantity may correspond to a case where the laundry quantity is equal to or less than 2 kg. The case where the laundry quantity is a vast quantity may correspond to a case where the laundry quantity is between 2 kg and 5 kg. That is, the preset amount may be the vast quantity and may be specifically 5 kg.

After a washing motion to wash laundry is determined, a washing cycle (S100) is performed. In a case where the sensed amount of laundry is equal to or less than the preset amount, a washing operation is performed with a washing motion including the rubbing motion (S110 to S150). When the sensed amount of laundry is greater than the preset amount, a washing operation is performed with a washing motion including a tumbling motion and/or a rolling motion and not including a rubbing motion (S190).

The rubbing motion includes a first rotation step (S110) in which the drum 60 is rotated in the first direction, and a second rotation step (S120) in which the drum 60 is rotated in the second direction. The first rotation step (S110) and the second rotation step (S120) have been described above, and thus, a detailed description thereof is herein omitted.

A time for which the wash motor 80 is rotated in the first direction and the second direction and a time for which the wash motor 80 is temporarily stopped, thereby adjusting a net acting ratio (S130). The net acting ratio may be set to be between 86% and 95%. A driving time T1 of the wash motor 80 may be set to 36 seconds, and a time for temporarily stopping the wash motor 80 may be set to 4 seconds, so that the net acting ratio can be 90%.

The controller 90 may control the wash motor 80 so that the drum 60 is rotated in the first direction and the second direction repeatedly. The controller 90 measures a driving time of the wash motor 80. When the driving time of wash motor 80 has not yet reaches a preset driving time T1, the controller 90 may rotate the drum 60 in the first direction and in the second direction alternately and repeatedly. When the driving time of the motor 80 reaches the preset driving time T1, the controller 90 may determine whether a washing time T2 elapses (S140).

When the washing time T2 elapses, the controller 90 may terminate a washing cycle. When the washing time T2 has not yet elapsed, the controller 90 may temporarily stop driving of the wash motor 80 (S150). In a case where the driving time T1 of the wash motor 80 is 36 seconds and the temporary stopping time of the wash motor 80 is 4 seconds, the wash motor 80 rotates the drum 60 in a counterclockwise direction and in a clockwise direction. When the washing time T2 has not been elapsed, the driving of the motor 80 is stopped for 4 seconds. After the driving of the wash motor 80 is stopped for 4 seconds, the first directional rotation and the second directional rotation S120 are repeated for the driving period T1. That is, the first rotation step and the second rotation step are performed for the driving time T1 alternately and repeatedly.

When the washing cycle (S100) is completed, a washing operation is terminated after passing through a rinsing cycle (S200) and a dewatering cycle (S300).

Hereinabove, exemplary embodiments of the present disclosure have been described with reference to the accompanying drawings. However, the present disclosure is not limited to a specific embodiment described above. It should be understood that many variations and modifications of the basic inventive concept described herein will still fall within the spirit and scope of the present disclosure as defined in the appended claims and their equivalents.

What is claimed is:

1. A washing machine comprising:
    a casing comprising a front panel that defines a hole at a front side of the casing;
    a tub that defines an opening at a front side of the tub, the opening of the tub facing the hole of the front panel;
    a drum provided in the tub and configured to rotate about a rotation center axis, the rotation center axis extending in a horizontal direction or being inclined more toward the horizontal direction than toward a vertical direction;
    a plurality of lifters that are provided on an inner circumferential surface of the drum and that are spaced apart from one another by an equal interval in a circumferential direction of the drum; and a wash motor configured to rotate the drum,
wherein the drum is configured to rotate in a first direction by a preset rotational angle and then to rotate in a second direction opposite to the first direction by the preset rotational angle,
wherein the preset rotational angle is in a range within 360° to 720°,
wherein a difference between a first rotation position of the drum at a beginning of a rotation in the first direction and a second rotation position of the drum at a beginning of a rotation in the second direction is less than or equal to a half of the equal interval of two adjacent lifters among the plurality of lifters in the circumferential direction of the drum.

2. The washing machine of claim 1, wherein the drum is further configured to alternately repeat the rotation in the first direction and the rotation in the second direction.

3. The washing machine of claim 2, wherein the drum is configured to rotate in the first direction and the second direction alternately for a first time period and then to stop for a second time period.

4. The washing machine of claim 3, wherein a net acting ratio of the first time period to a sum of the first time period and the second time period is in a range between 86% and 98%.

5. The washing machine of claim 1, wherein the drum is configured to, based on rotating in the first direction and the second direction, rotate at a constant acceleration until reaching a target rotational speed and then to rotate at the target rotational speed, and
wherein the target rotational speed is a constant speed.

6. The washing machine of claim 1, wherein the drum is configured to rotate at a constant target rotational speed based on the drum rotating in the first direction and the second direction,
wherein the constant target rotational speed is in a range within 56 rpm to 94 rpm.

7. The washing machine of claim 6, wherein the drum is configured to rotate at constant acceleration until reaching the constant target rotational speed, and
wherein an acceleration gradient is equal to or greater than 30 rpm/s.

8. The washing machine of claim 7, wherein the acceleration gradient is set to a maximum value that can be output from the wash motor.

9. The washing machine of claim 1, wherein a rotation position of the drum at a beginning of rotation in the second direction is reversed from the rotational position of the drum at a beginning of rotation in the first direction.

10. The washing machine of claim 1, wherein the plurality of lifters protrude from the inner circumferential surface of the drum and has a height is equal to or higher than 10 mm and equal to or lower than 20 mm.

11. The washing machine of claim 1, further comprising a controller configured to control a rotation of the drum through the wash motor.

12. The washing machine of claim 11, wherein the controller is further configured to detect an amount of laundry inside the drum,
wherein the drum alternately repeats rotation in the first direction and rotation in the second direction based on the detected amount of laundry being less than a preset amount, and
wherein the drum is configured to rotate in the first direction more than the preset rotational angle based on the detected amount of laundry being greater than the preset amount.

13. The washing machine of claim 11, further comprising a water supply configured to supply water to the tub.

14. The washing machine of claim 13, wherein the water supply is configured to supply water to the tub such that a level of the tub is higher than a lower portion of the drum that is positioned vertically below a rotation center of the drum.

15. The washing machine of claim 13, wherein an amount of the water supplied to the tub is eight to twelve times an amount of laundry in the drum.

16. The washing machine of claim 1, further comprising a nozzle configured to spray water discharged from the tub into the drum while the drum rotates in the first and second directions.

17. The washing machine of claim 1, wherein the difference between the first rotation position and the second rotation position of the drum is equal to one half of the equal interval of the two adjacent lifters.

18. The washing machine of claim 1, wherein the equal interval of the two adjacent lifters is 120°, and the difference between the first rotation position and the second rotation position of the drum is 60°.

19. The washing machine of claim 1, wherein the difference between the first rotation position and the second rotation position of the drum is less than one half of the equal interval of the two adjacent lifters.

20. A washing machine comprising:
a tub;
a drum rotatably provided in the tub;
a lifter provided on an inner circumferential surface of the drum;
a wash motor configured to rotate the drum; and
a controller configured to control a rotation of the drum through the wash motor,
wherein the drum is configured to rotate in a first direction by a preset rotational angle and then to rotate in a second direction opposite to the first direction by the preset rotational angle,
wherein the preset rotational angle is in a range within 360° to 720°, and
wherein the controller is further configured to:
detect an amount of laundry inside the drum,
control the drum to alternately repeat a rotation in the first direction and a rotation in the second direction based on the detected amount of laundry being less than a preset amount, and
control the drum to rotate in the first direction more than the preset rotational angle based on the detected amount of laundry being greater than the preset amount.

* * * * *